(12) United States Patent
Moeseneder et al.

(10) Patent No.: US 8,419,135 B2
(45) Date of Patent: Apr. 16, 2013

(54) SEAT, PARTICULARLY FOR PUBLIC TRANSPORTATION

(75) Inventors: Johann Moeseneder, Thalheim/Wels (AT); Franz Stollberger, St. Martin (AT); Christine Luedeke, Zurich (CH)

(73) Assignees: Greiner Purtec GmbH, Kremsmuenster (AT); Kobieder Strickmode GmbH, St. Martin i.I. (AT); Ludeke Design, Zurich (CH)

( * ) Notice: Subject to any disclaimer, the term of this patent is extended or adjusted under 35 U.S.C. 154(b) by 610 days.

(21) Appl. No.: 12/450,781

(22) PCT Filed: Apr. 11, 2008

(86) PCT No.: PCT/AT2008/000133
§ 371 (c)(1),
(2), (4) Date: Dec. 3, 2009

(87) PCT Pub. No.: WO2008/124859
PCT Pub. Date: Oct. 23, 2008

(65) Prior Publication Data
US 2010/0117430 A1    May 13, 2010

(30) Foreign Application Priority Data

Apr. 13, 2007  (AT) ..................................... 578/2007
Apr. 1, 2008   (AT) ..................................... 507/2008

(51) Int. Cl.
*A47C 7/02*    (2006.01)
*B60N 2/58*    (2006.01)
*B60N 2/48*    (2006.01)
*B60N 2/62*    (2006.01)

(52) U.S. Cl.
USPC ............ 297/452.13; 297/452.19; 297/452.56; 297/440.11

(58) Field of Classification Search ............. 297/440.11, 297/452.19, 452.13, 452.56; 5/110, 111, 5/122, 123
See application file for complete search history.

(56) References Cited

U.S. PATENT DOCUMENTS

| 2,644,508 A | 7/1953 | Weill |
| 2,865,436 A | 12/1958 | Thorne |

(Continued)

FOREIGN PATENT DOCUMENTS

| DE | 34 03 967 | 8/1985 |
| DE | 202 16 302 | 5/2003 |

(Continued)

OTHER PUBLICATIONS

DIN EN ISO 13934-1, Apr. 1999. (Spec, pp. 25-26 and 28 and claims 6 and 10).

(Continued)

*Primary Examiner* — David Dunn
*Assistant Examiner* — Tania Abraham
(74) *Attorney, Agent, or Firm* — Collard & Roe, P.C.

(57) ABSTRACT

The invention relates to a seat (1) having a carrying frame (2) and a support unit (8) connected thereto, the support unit having a base frame (6) as well as an elastic cover (10) held thereon made of knitted fabric (11) as an unsupported structure, the cover (10) forming a support surface (9) having a seat region (13) and a back region (12) and being configured continuous between the seat region (13) and the back region (12). The support surface (9) of the cover (10) has a plurality of zones (33 to 38) located consecutively in the longitudinal direction of the cover, of which at least one zone (34) has a greater elastic deformability relative to the other zones (33, 35, 36, 37, 38). In a longitudinal edge region (41) of the knitted fabric (11) there is arranged on both sides of the seating region (13) always an additional strip-shaped edge section (43) of zone (34), having the greatest elastic deformability.

20 Claims, 15 Drawing Sheets

U.S. PATENT DOCUMENTS

| | | | |
|---|---|---|---|
| 3,600,035 A | 8/1971 | Vondrejs | |
| 3,999,802 A | 12/1976 | Powers | |
| 4,230,365 A | 10/1980 | Messinger | |
| 4,522,447 A | 6/1985 | Snyder et al. | |
| 5,013,089 A | 5/1991 | Abu-Isa et al. | |
| 6,817,674 B2 * | 11/2004 | Fujita et al. | 297/452.48 |
| 6,854,805 B2 * | 2/2005 | Fujita et al. | 297/452.56 |
| 6,988,774 B1 | 1/2006 | Elzenbeck | |
| 7,134,718 B2 * | 11/2006 | Yasuda et al. | 297/216.13 |
| 7,156,457 B2 * | 1/2007 | Fujita et al. | 297/216.1 |
| 2004/0160109 A1 | 8/2004 | Bottemiller | |

FOREIGN PATENT DOCUMENTS

| | | |
|---|---|---|
| EP | 1 056 371 | 12/2000 |
| EP | 1 680 981 | 7/2006 |
| EP | 1731058 A1 * | 12/2006 |
| WO | WO 99/43239 | 9/1999 |
| WO | WO 2008/023228 | 2/2008 |

OTHER PUBLICATIONS

DIN EN 14704-1, Jul. 2005. (Spec, p. 26 and claim 3).
International Search Report.

* cited by examiner

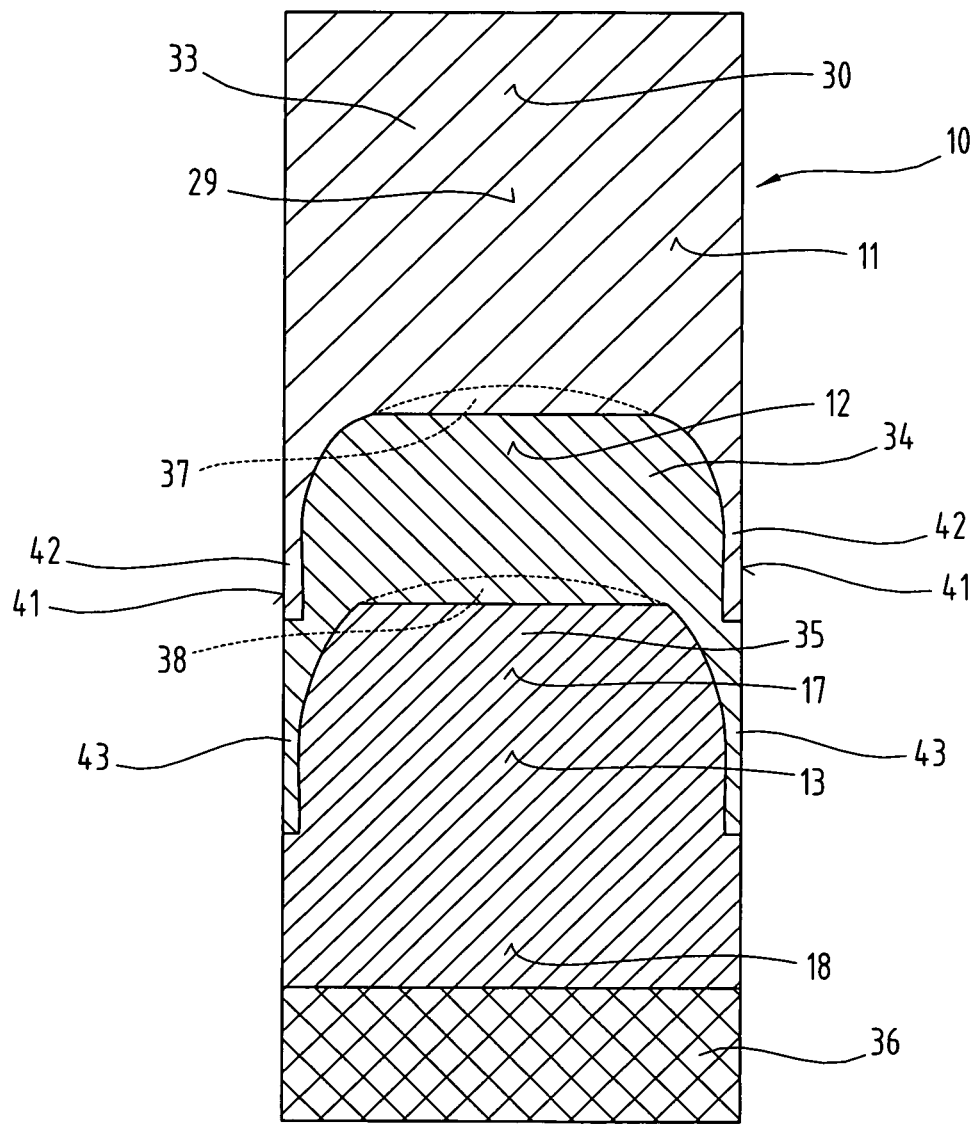

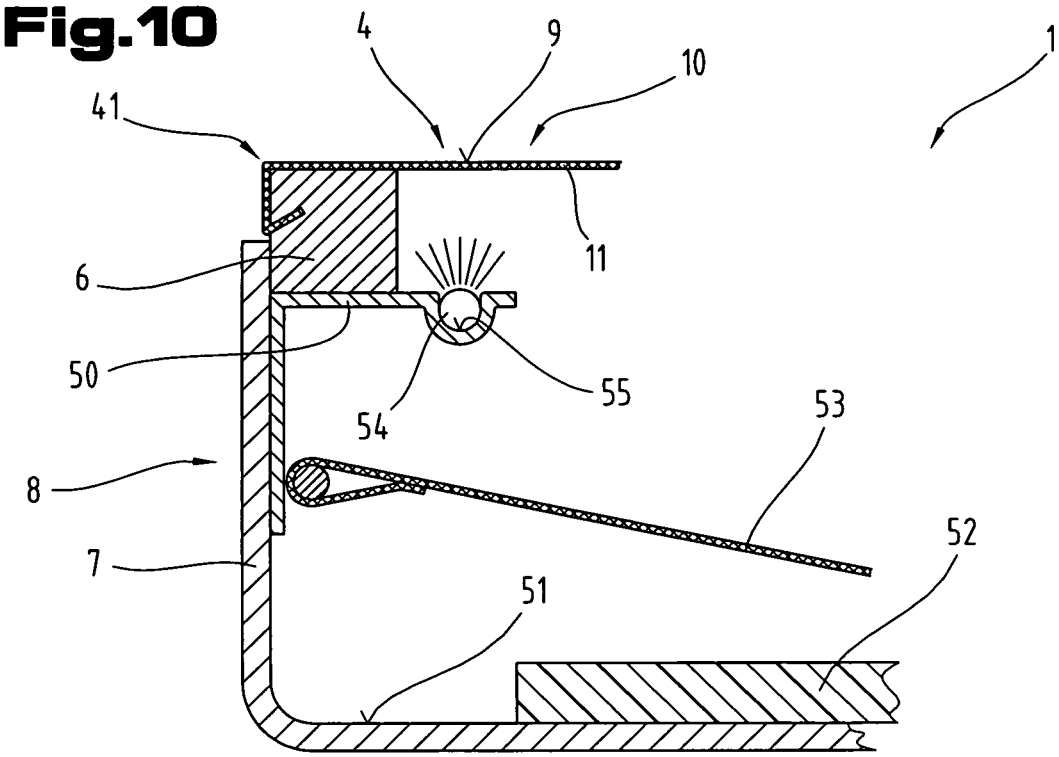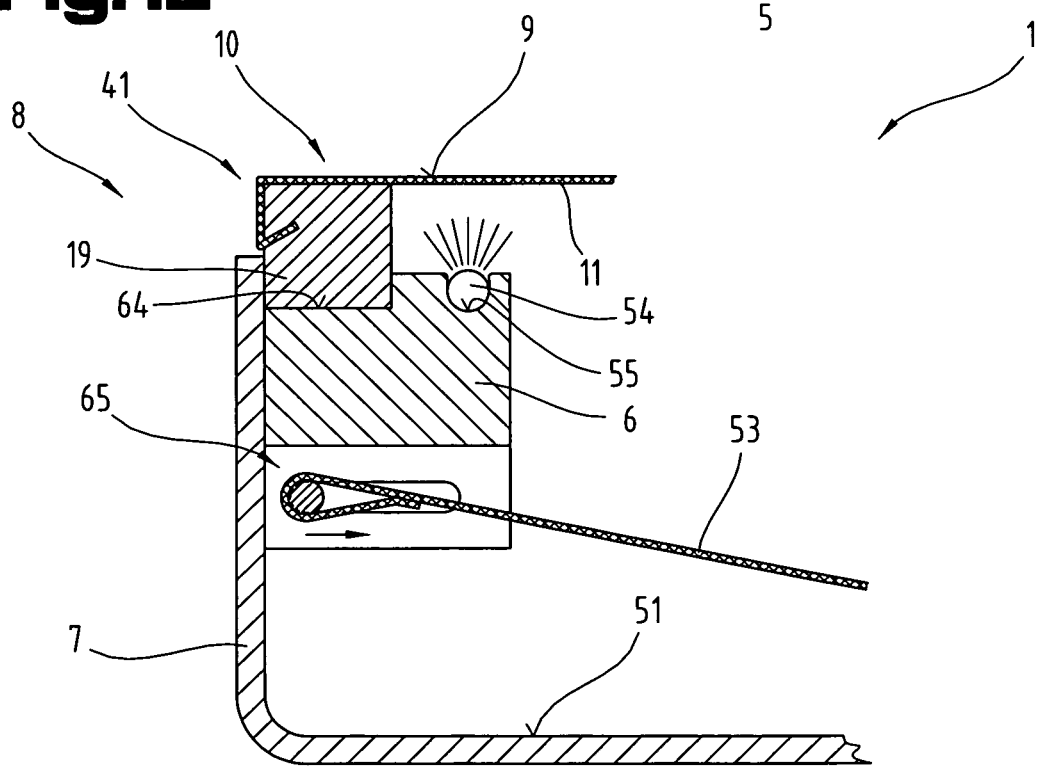

SEAT, PARTICULARLY FOR PUBLIC TRANSPORTATION

CROSS REFERENCE TO RELATED APPLICATIONS

This application is the National Stage of PCT/AT2008/000133 filed on Apr. 11, 2008, which claims priority under 35 U.S.C. §119 of Austrian Application No. A 578/2007 filed on Apr. 13, 2007 and Austrian Application No. A 507/2008 filed on Apr. 1, 2008. The international application under PCT article 21(2) was not published in English.

The invention relates to a seat, particularly for public transportation, having a carrying frame and a support unit connected thereto, said support unit having a base frame as well as an elastic cover held thereon made of a knitted fabric as an unsupported structure and said cover forming a support surface having a seat region and a back region.

From WO 99/43239 A1 or EP 1 056 371 B1 which is derived therefrom a covering for a lounger is known, which comprises a continuous support or holding frame for mounting and supporting the covering. The covering is a textile structure in the form of a knitted or woven fabric made of plastic threads. Said knitted fabric is secured with varying tension to the longitudinal rails of the support frame, whereby in the longitudinal direction of the longitudinal rails there are sections with varying tension. Owing to the varying tension of the textile structure areas of different elasticity are formed in longitudinal extension. In the lounger shown here the tension is greatest in the most highly loaded area, namely in the region of the seat, which has less elasticity and is thus less yielding.

U.S. Pat. No. 4,230,365 A describes a piece of furniture consisting of a self-supporting frame and a continuous textile cover for covering the frame parts. The textile cover material is made from a knitted material with elastic properties. The side frame parts are joined together by cross braces, and between the textile cover and cross braces an additional foam rest is arranged for support. The textile cover is used only for covering the frame parts and does not have a self-supporting function or areas of varying deformability for supporting the user.

From U.S. Pat. No. 3,999,802 A a chair with a tubular frame is known, which is covered by a cover material in the seat and back area. The latter is pulled over the tubular frame in the form of a textile sleeve. In the transitional area between the seat and back part cross braces are provided. To assist with assembly the sack-like cover material has an opening at the end facing the knee area so that it can be pulled over the frame and mounted thereon. The textile cover does not have any areas of varying deformability for supporting the user.

From U.S. Pat. No. 2,865,436 A1 a seat consisting of a frame and a cover material is known, in which the cover material provided for sitting on is secured laterally to the frame parts by means of elastic tensioning elements. The elastic properties of the cover material are provided only by elastic pulling elements arranged in the region of the two longitudinal sides to achieve a certain degree of elasticity.

U.S. Pat. No. 3,600,035 A describes a cover material for a seat part consisting of a frame, wherein the frame has a brace element running transversely between the side frame parts in the transitional area between the seat and the backrest. The cover material has a solid, virtually inelastic support body for transferring the weight of the person sitting down onto the frame. Between the layers of the cover material an additional foam part is provided to improve the sitting comfort further. The cover or casing does not include areas of varying deformability for supporting the user.

DE 202 16 302 U1 describes an office chair with a reclining backrest which has an elastic cover. The back rest comprises a frame onto which the cover is secured. Said cover is in the form of a hose-like knitted fabric, wherein the center has greater elasticity for supporting the back than the edge areas surrounding the latter. In this way it is possible for the user to deform the back part in the central area of the cover in the reclined position more deeply into the knitted fabric than in the edge areas. The seat consists of a seat support on which a cushion is mounted. The seat and the backrest are separate but connected components.

From DE 34 03 967 A1 a vehicle seat with a separate seat part and backrest is known, in which both the seat part and the backrest part have areas of varying elasticity. The areas of varying elasticity are divided into panels in both seat parts. The seating area has greater elasticity in the center and greater elasticity than the two immediately adjoining front and back areas. The whole seat is surrounded to the side and rear by a U-shaped outer area, which compared to other areas, has the lowest elasticity and thus the greatest strength. Also the back area has a U-shaped edge zone surrounding the latter externally which has the lowest elasticity and thus the greatest strength. The back area itself is designed to have areas of varying elasticity but greater elasticity than the outer area. The areas of varying strength are formed by closely aligned chambers or tubes filled with cushioning material.

From U.S. Pat. No. 4,522,447 A seat and back cushions made from foam material are known, in which in the case of the seat cushion the seat area has greatest elasticity in the area of direct support. Said central area is surrounded by a foam material with a higher modulus of elasticity and the latter thus has greater strength.

From U.S. Pat. No. 2,644,508 A a chair is known in which the seat and back part comprise side holding and support elements, which are mounted on U-shaped parts comprising feet and a rest element. Tensioned spring elements and cross braces are arranged between the side holding or support elements, and transverse spring elements are used to support the continuous rest. An additional filling or cushioning material is inserted into the sections forming the seat and the backrest between the layers forming the rest. The greatest elasticity is obtained by the transverse spring elements by taking load away from the continuous rest. In order to adjust the length during use of the continuous rest both ends on the underside of the seat are joined together by means of an elastic connecting element in the form of a tension spring. In this way the length can be adjusted during use.

WO 2008/023228 A1 also describes a seat unit consisting of a seat and a back part. Both the seat and the back part have separate elastic support elements which are covered by a continuous covering material. In the transitional area between the seat and back rest the covering material is looped over a cross brace and then arranged to extend continuously over the back part to the rear. Load is passed from the covering material to the elastic support parts of the seat or backrest.

From EP 1 680 981 A1 a chair is known with a one-piece seat and backrest which has a bent tubular shell frame. To support the user a one-piece knitted fabric with a peripheral piping seam is used. The bent tubular shell frame is mounted in the surrounding piping seam, whereby in the area behind the knee the cover has at least one opening for holding the ends of the tubular shell frame apart by means of a clamping rod. In this case the knitted fabric is arranged to be continuous between the seat and the back area and has a uniform strength.

US 2004/0160109 A1 describes a seat in which the seat and back part are formed by a frame which is covered by a sack-like sleeve. Said sleeve forms the covering of the chair and runs continuously from the seat to the back part. The edge section facing the support frame has less elasticity than the two layers forming the support.

A seat arrangement has become known from U.S. Pat. No. 5,013,089 A which comprises a carrying frame and a plurality of frame elements to form the seat and back part. The two frame parts forming the seat and back frame are formed by their own frames which run continuously around. The two frame parts are connected to one another via angle braces to form a seat frame. The seat surface and the back surface are each spanned by a knitted fabric held on the frame part to form the seat or back support. As a result of the two frame parts to form the seat and back part, an individual adoption of different seat positions is not possible.

Seats having upholstery made of plastic foam are very widely used in modern vehicle construction. They are primarily used in rail and road vehicles but also predominantly in aircraft. Whereas the regulations valid for rail vehicles already prescribe very stringent guidelines regarding the self-extinguishing construction of the materials used or the smoke development, these are still far exceeded by the regulations valid in the aircraft industry. A test is prescribed for seats licensed for use in aircraft in which the cushions are directly exposed to a flame from a burner in their fitting provided for installation. This flame acts directly on the cushion for a duration of 2 minutes after which the flame is extinguished or removed. If the flames have not extinguished themselves by then, the cushion is extinguished after 5 minutes. After this fire test, the weight loss of the cushion must not be higher than 10%. In order to satisfy these extremely stringent regulations, and at the same time also achieve a high seating comfort in long flights and a low weight, seat cushions have been adhesively bonded together from various open-cell elastic soft foam plastics provided with flame retardants, having different weights per unit volume.

It is the object of the present invention to provide a seat which has an improved seat comfort with lower intrinsic weight and which allows different usage positions for the user.

The object of the invention is achieved in that the area of greatest elastic deformability is formed between the seat part and the back part, and in that in a longitudinal edge area of the fabric on both sides of the area forming the seat part there is a further strip-like edge section of the area of greatest elastic deformability. The advantage achieved by means of the features of the invention is that in this way it is possible for the user in the upright seating position to extend the covering sufficiently during use to the extent that the user is able to sink into the covering stretched onto the frame. Owing to the high elastic deformability of the fabric the user is able to sink between the lateral frame parts into the covering but there is still optimum support over the entire bearing or support surface of the user. The bordering areas of the seat and back part are less deformable than the area of greatest elastic deformability, whereby in this case an appropriate amount of counterpressure is exerted by the covering on the user during use. Furthermore, in the edge area of the seat surface there is an area of higher elasticity which allows the controlled sinking or tilting of the entire seat surface in the direction of the seat unit. Interfering frame parts for adopting different usage positions can be avoided by the cover being continuous between the seat surface and the back rest. As a result, the possibility is created for a user to use the entire continuously configured cover for his support on the seat and to be able to adopt individual seat positions without any adjustment of a seat part. Due to the arrangement of a plurality of different zones over the longitudinal or transverse extension of the knitted fabric, the elastic deformability of the cover can be adjusted in such a manner that when the backrest is fixed relative to the seat frame, different seating or lying positions can nevertheless be adopted. As a result of the different elastic formability of the individual zones, the desired support of the user on the cover can be predefined for different usage positions without any adjustment of a frame part of the seat being necessary for this. In addition, a substantially smaller volume is required for supporting the user by the cover which is configured as knitted fabric than is the case with the foam plastic cushions hitherto usually used, with the result that the amount of materials exposed to possible combustion and associated development of smoke is negligible for the combustion behavior.

A further embodiment is also advantageous since this creates the possibility for the user in the upright sitting position to be able to sufficiently stretch the cover during usage to such an extent that it is possible for the user to sink into the cover spanned on the frame. Due to this high elastic deformability of the knitted fabric, it is possible for the user to sink into the cover between the laterally disposed frame parts and nevertheless, optimal support is achieved over the entire contact or support surface of the user. The adjoining zones of the seat and back region have a lower deformability relative to the zone having the greatest elastic deformability with the result that a corresponding counterpressure of the cover is exerted on the user during use.

An embodiment is also advantageous since within certain limits of already very low tensile force, a high stretching of the cover can thus be achieved in this range and nevertheless, sufficient support is ensured during use.

Due to the embodiment, it is possible to exactly pre-determine the stretching behavior of the elastic zone.

According to another embodiment, a visual unity of the entire cover is achieved despite different elastic properties.

A further development is also advantageous since a higher supporting force for the back region and associated with this, a firmer or more rigid cover can be created.

In another embodiment, it is advantageous that a cover can thus be created which ensures high seating comfort for the user even for longer flights.

A further development has the result that a seat region adapted to the shape of the human body can thus be achieved which nevertheless allows sufficient elastic deformability.

Due to another embodiment, the stretching behavior and therefore the available number of stitches of the knitted pattern can be fixed or predetermined.

An embodiment is also advantageous since sufficient support of the user can be achieved in the region of the seat surface and nevertheless sufficient seating comfort can be achieved.

According to an embodiment, a cover can be created which ensures high seating comfort for the user even during longer flights.

An embodiment proves to be advantageous because a zone having high elasticity is provided specifically in the region of the seat surface in its edge region which allows a controlled sinking or folding down of the entire seat surface in the direction of the seat unit.

According to an advantageous further development, the fraction of the highly elastic zone is enlarged, thus making possible more uniform sinking of the user into the cover.

However, an embodiment is also advantageous since as a result, few components can be sufficient to form the seat and thus the overall weight of the seat can be further reduced. In addition, a sufficient support is achieved for the cover, with the result that optimal removal of load from the cover towards the support unit is achieved.

According to another embodiment, complex adjusting mechanisms can be dispensed with between the back rest and the seat region since different sitting or reclining positions are made possible exclusively by the different elasticity or stretching behavior of the cover.

In another embodiment, consideration can easily be given to different usage conditions of the seat, wherein the continuously fixed angle makes it possible to have a simple, cost-effective frame structure.

An embodiment is also possible because the distance which a user covers when taking his place on the seat until the first contact with the cover is thereby minimized. Furthermore, even better support during usage in the manner of a shell seat in the cover is thereby achieved.

The configuration according to another embodiment makes it possible to achieve a controlled sinking of the user into the seat region. In addition, however, slipping out from the seat during use, particularly in the event of severe decelerations, is avoided.

Another embodiment is advantageous because as a result, a unit can be created from the cover and the base frame which can be supplied pre-assembled for the cleaning staff or service staff.

However, an embodiment is also advantageous since the cover can thereby be simply exchanged when dirty or destroyed.

A further embodiment is also advantageous since as a result, an even more stable configuration of the seat can be achieved and certain carrying or support functions can be transferred from the cladding element to the base frame. As a result, the cladding element can be configured to be lighter and less stable.

An embodiment is furthermore advantageous since in the event of too severe loading or heavy users, a direct abutment against the inner surface of the cladding element can thus be damped by the intermediate layer.

As a result of another embodiment, the support behavior of the cover and the intermediate layer can be simply matched to one another.

According to another embodiment, too-severe elastic deformation of the cover for the user in certain regions is prevented and as a result, the maximum supporting force of the cover is increased in cooperation with the support belt or belts. At the same time, however, sagging or thudding of the user together with the cover on the cladding element can thus be avoided.

A further development is also advantageous since the free space for accessibility and taking his place on the seat is thus increased for the user. After corresponding folding out, the seat surface is enlarged to the full extent and thus a sufficient support is also achieved in the back-of-the knee region.

In another embodiment, it is advantageous that a sufficiently stable support during use of the seat is thus ensured for the user in combination with the cover and the pivotable frame part.

A further development has the result that sufficient space can thus be created for access to the seat or row of seats and nevertheless, no interfering parts are present in the region of the seat. It is thus possible to preliminarily place items on the remaining seat surface.

Further advantageous embodiments for the pivoting of the front frame part of the seat are described below. Due to the lever arrangement and the elastically deformable transition element, a pivoting movement can be achieved in which the cover is sufficiently guided in its holding region on the base frame or cover carrying frame. As a result, not only is any damage to the cover avoided but a continuous clamped holding is also achieved.

Due to another embodiment, the pivoting movement of the frame part is made simple for the user.

An embodiment is also advantageous since any actuating processes are thus avoided for the user and the pivoting of the frame part between the readiness position and the usage position can be executed in an automated manner. The detection can be made here, for example, according to the weight force whereby, on removing the weight force the frame part is folded down and during usage and loading of the seat with a weight force, the frame part and therefore the supporting section is arranged so that it is folded up in the usage position.

Further advantageous embodiment of the independently triggerable adjusting device with its components are described in below. As a result, when the front frame part is folded down, the load introduced by the user on the cover in the seat region is determined by means of the detection device and transmitted via the transmission device to the adjusting device. Thus, if there is sufficient space between the seats, the user can reach his seat and the maximum seat depth is only made available to the user after sitting down. This takes place automatically without any actuation of any triggering mechanism being deliberately required from the user.

According to an embodiment, an even better support of the user's head on the seat is achieved.

An embodiment proves to be advantageous since this makes it easy for the user to achieve a shell-shaped receptacle for the head due to the adjustable side parts and thus ensure sufficient support even in the temple region in a rest position.

According to advantageous further developments, it is possible to adjust the inclination of the headrest with respect to a vertical and thus achieve better matching to different body sizes of users.

Finally, however an embodiment is possible whereby a height matching of the headrest can easily be executed.

The invention is explained in detail hereinafter with reference to the exemplary embodiments shown in the drawings.

In the figures:

FIG. 5 shows a possible embodiment of the cover with different zones in plan view in a stretched flat position;

FIG. 10 shows a partial region of the cladding element from FIGS. 8 and 9 in a cutaway view along the lines IX-IX in FIG. 8 as well as a simplified schematic view;

FIG. 12 shows another partial region of the cladding element with a base frame disposed therein, in cutaway view and simplified schematic view;

Figure 1:
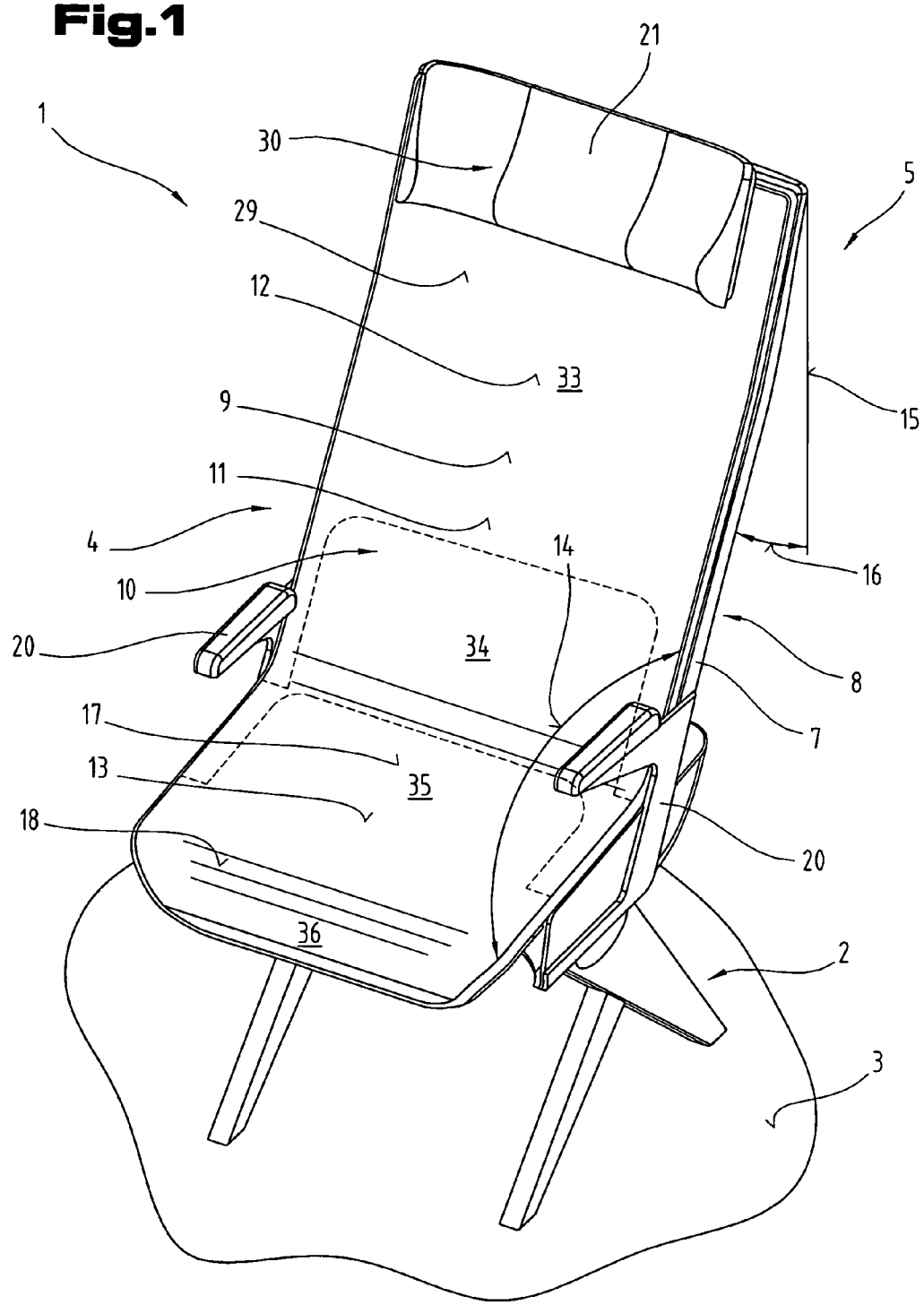
FIG. 1 shows a seat according to the invention in a simplified diagrammatic view, with the viewing direction towards the user side and in the usage position of the entire seat surface.

It should be noted by way of introduction that in the variously described embodiments, the same parts are provided with the same reference numerals or the same component designations, wherein the disclosures contained in the entire description can be appropriately applied to the same parts having the same reference numerals or the same component designations. The positional information selected in the description such as, for example, top, bottom, lateral etc. are related to the figure being directly described and depicted and in the event of a change in position, can be appropriately applied to the new position. Furthermore, individual features or feature combinations from the different exemplary embodiments shown and described can also by themselves constitute independent, inventive solutions or solutions according to the invention.

All the information on ranges of values in the present description are to be understood such that these comprise any and all partial ranges thereof, for example, the information 1 to 10 is to be understood such that all partial regions starting from the lower limit 1 and the upper limit 10 are included, i.e. all partial regions begin with a lower limit of 1 or greater and end with an upper limit of 10 or less, e.g. 1 to 1.7 or 3.2 to 8.1 or 5.5 to 10.

Figure 2:
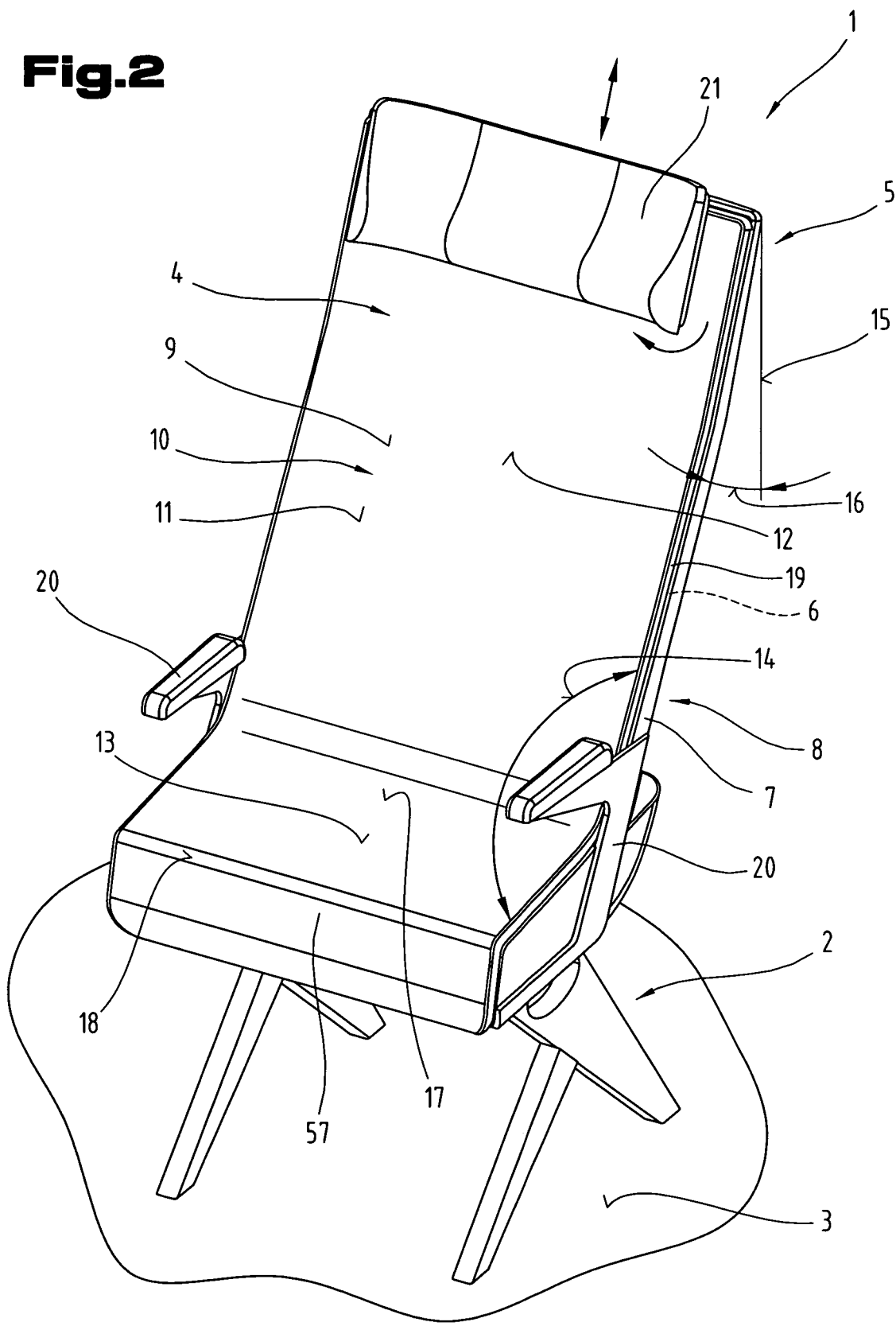
FIG. 2 shows the seat from FIG. 1 with shortened seat surface, in a simplified diagrammatic view and viewing direction towards the user side.
Figure 3:
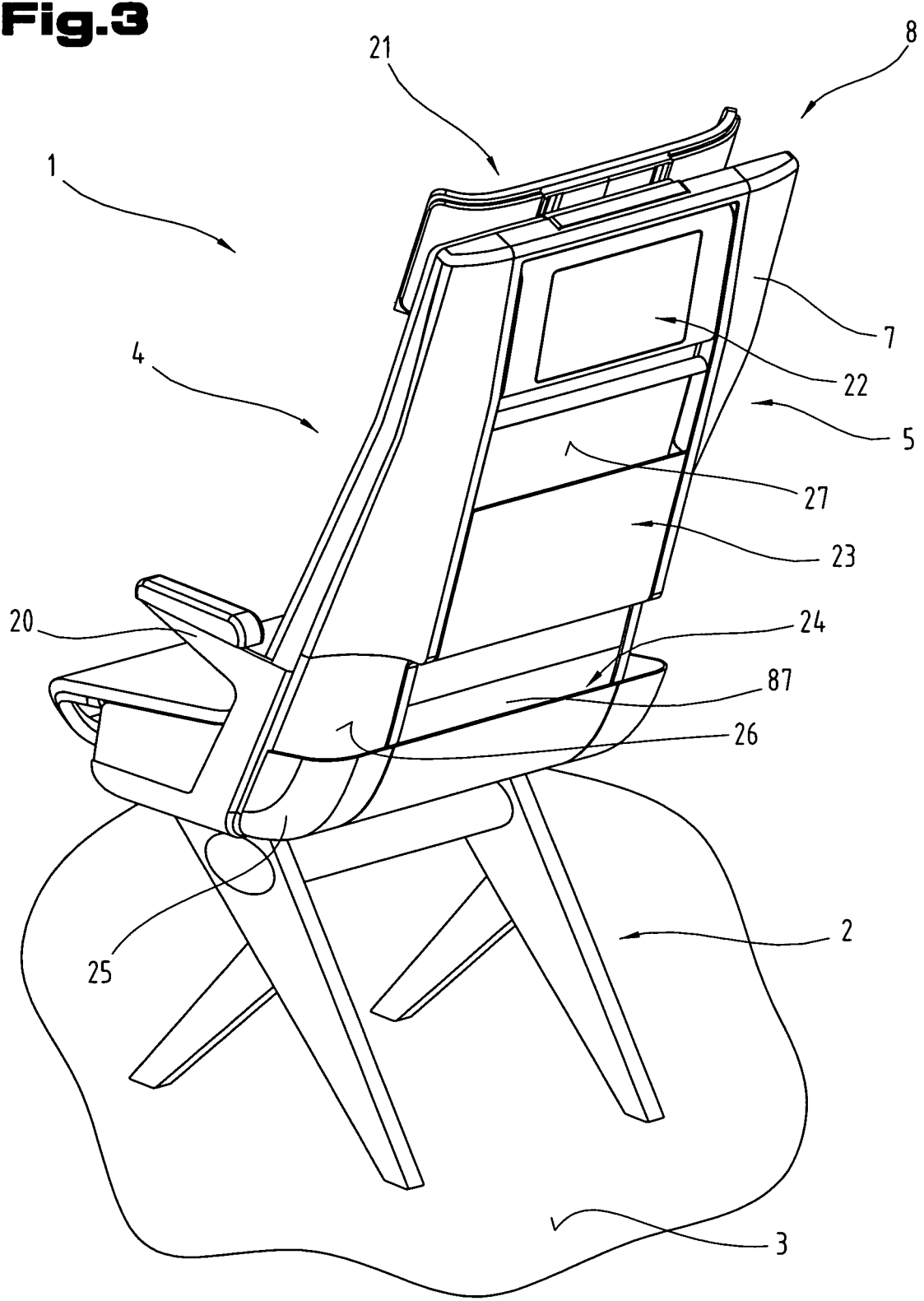
FIG. 3 shows the seat from FIG. 1 in a simplified diagrammatic view, with viewing direction towards its rear side.

FIGS. 1 to 3 show a seat 1, for example, in a public transportation means such as, for example, an aircraft, a railway, a tramway or the like in a schematically simplified view. However, it would also be possible to use this seat 1, for example, in other public transportation means such as an underground or a bus. Independently of this, however, the seat 1 could also be used as seating accommodation in function rooms such as theatres, congress halls, public function rooms, multipurpose buildings etc., omitting and/or adding some of the components described subsequently in further detail.

In the exemplary embodiment shown here, for better clarity only a single seat 1 for a user, not shown in detail, is shown but it is possible to arrange a plurality of seats 1 configured in this manner adjacent to one another to form a connected row of seats and also to arrange a plurality of such seats consecutively.

This seat 1 comprises a carrying frame 2 which is supported on a standing surface 3 shown simplified or is held on or in said surface. For the sake of better clarity, various connection possibilities were not shown, these being freely selectable and usable from the known prior art. The seat 1 has a user side 4 which faces the user and accommodates said user for sitting and/or reclining and a rear side 5 facing away therefrom. The rear side 5 is facing another user who is located immediately behind this user in the case of a plurality of consecutively arranged seats 1. The seat 1 further comprises a base frame 6 and a cladding element 7 which together form a support unit 8. The cladding element 7 is preferably connected to the carrying frame 2 or held on said frame, wherein the base frame 6 can be accommodated by the cladding element 7. In this case, the cladding element 7 is disposed in the region of the rear side 5 of the seat 1. The support element 8 can furthermore be configured as rigid per se, in which case any scope for adjustment relative to the carrying frame 2 is eliminated.

The user side 4 of the seat 1 forms a support surface 9 or receiving surface for the user of the seat 1. In the exemplary embodiment shown here, this support surface 7 is formed by a cover 10, for example in the form of a knitted fabric 11. This cover 10 is used to support the user and is here configured to be continuous, starting from a back region 12 as far as a seat region 13. This has the advantage that in the transition zone between the back and seat region 12, 13, no transverse spar of the base frame 6 is disposed and thus only the cover 10 is used for supporting and accommodating the user. In the unused initial position of the cover 10, the back region 12 and the seat region 13 enclose an angle 14 between them which lies in a range having a lower limit of 90°, in particular 110°, preferably 125° and an upper limit of 180°, in particular 150°, preferably 135°. A value of the angle 14 can also lie between 128° and 132°.

In the section of the back region 12, the base frame 6 is at an angle 16 in a range having a lower limit of 0°, in particular 20° and an upper limit of 45°, in particular 30°, with respective to a vertical 15 shown simplified. This angle 16 relative to the vertical 15 is dependent on the embodiment or use of the seat 1 but is always fixedly predefined for the user in the respective usage case and configured to be invariable for this user. As a result, complex adjusting mechanisms as in otherwise usual aircraft seats are eliminated. The nevertheless different seat or rest positions are made possible merely by the special configuration of the cover 10.

The section of the base frame 6 in the back region 12 which is also configured to be rigid with respect to the vertical 15 is located in the provided continuously fixed usage position in an angular position relative to the vertical 15 which is designated as so-called "recline position" in air passenger traffic and is usually only adjusted by a dedicated conscious adjustment of at least one seat part in conventional seats. As a result, a larger angle 16 with respect to the vertical 15 is formed in the back region 12 of the cover 10 compared with the normal upright seat position in conventional seats.

As described previously, the cover 10 continuously forms the support surface 9 for the user, starting from the back region 12 as far as the seat region 13. The cover 10, particularly when this comprises the knitted fabric 11, will be described in detail hereinafter. The seat region 13 for its part can be divided into a buttocks region 17 and a thigh region 18. These previously designated regions in turn form their own zones on the cover 10, wherein a further subdivision can be made inside these zones. These regions or zones will be described in further detail hereinafter.

The cover 10 for its part can be connected to the fixed base frame 6 or held thereon by various possibilities for fastening. This can be accomplished, for example, by a tubular holding in the edge regions, various beading solutions etc. In this embodiment the base frame 6 together with the cover 10 held thereon is connected to the cladding element 7, thus forming the support unit 8. This creates the possibility of removing the base frame 6 together with the cover 10 from the cladding element 7 and of making a rapid exchange when this is dirty or damaged.

Regardless of this, however, in order to reinforce the cladding element 7 and to facilitate the mounting or dismounting of the cover 10 on the seat 1, in particular on the cladding element 7, it would also be possible for this to be held on a dedicated additional cover carrying frame 19 or connected thereto. The cover carrying frame 19 for its part can be detachably connected to the base frame 6 if the base frame 6 is connected to the cladding element 7 and forms the support unit 8. A faster and simpler exchange of the entire cover 10, for example, after contamination or damage to the same, is thereby achieved for cleaning or service staff.

It can be seen from a combined view of FIGS. 1 and 2 that the front seat section 57 of the seat region 13 facing the knee region of the user can be shortened in its length. Various possibilities for this have become known from the prior art. Here the shortening is achieved by simply folding down the cover 10 together with the base frame 6 and/or cover carrying frame 19. This shortening serves to increase the intermediate space between directly consecutively arranged seats 1 for the user to walk towards and away from. In the readiness position the seat section 57 of the seat region 13 facing the back-of-the-knee region is located in the folded-down position according to the diagram in FIG. 2. When the user takes a seat on the seat surface or the seat region 13, the folded-down seat section 57 of the seat region 13 is adjusted into the position shown in FIG. 1, in particular is folded upwards and adopts its usage position. The adjusting movement is preferably effected by a pivoting movement of a section of the base frame 6 and/or the cover carrying frame 19. The cover 10 makes this deformation without any problems as a result of its elasticity and stretching properties. If the user gets up from the seat region, an unloading of the cover 10 occurs and the front seat region section is adjusted back into the folded-down position. Instead of a folding down, however, a folding up of the front seat section would also be possible but leads to an additional reduction of the free space in the seat region 13. This adjusting movement is preferably executed in an automated manner actually by the user himself since this comprises an adjusting process directed contrary to the usual intuitive movement sequence. The pivoting movement and its execution will be described hereinafter.

The seat 1 further comprises armrests 20 each disposed laterally of the seat region 13 and shown in simplified manner, which are likewise preferably held fixedly on the support unit 8, in particular the base frame 6 and/or the cladding element 7 as well as optionally on the carrying frame 2. Each seat 1 is preferably assigned its own armrests 20 on both sides. As a result, in a multiple arrangement of seats 1 adjacent to one another, each of the individual users has his own two armrests available.

A headrest 21 shown in simplified form is provided above the back region 12, wherein the configuration and the scope for adjustment of the same are also described in detail hereinafter. The headrest 21 is located in front of the cover 10 on the user side 4.

Various devices or apparatus are provided or disposed for a further user in the region of the rear side 5 of the seat 1. Starting from the region of the seat 1 at the greatest distance from the standing surface 3, this here comprises a display element 22, a pivotally mounted table 23, at least one receiving element 24 for newspaper or personal effects as well as at least one retaining element 25 preferably disposed at both edge regions. This retaining element 25 can be used, for example, for holding bottle or can-shaped items, in particular for storing drinks. In the region of the retaining element or elements 25, in this exemplary embodiment the cladding element 7 has a concave surface 26 which is curved in the direction of the user side 4, and which additionally extends in the longitudinal direction of the back region 12. This concavely curved surface 26 makes it possible to hold various items in cooperation with the retaining element 25 on the seat 1, in particular the cladding element 7, in a space-saving manner. Furthermore, however, it is also possible for persons having a larger body size to accommodate the bent knee region in these regions at the side of the seat during use of the following seat 1. It is thereby possible for persons having longer thighs to comfortably sit on the seat 1 and also adopt a relaxed position. The receiving element 24 and the retaining element 25 can also be formed by a cover which can again be fabricated in particular from a knitted fabric or the like.

The previously described additional components in the region of the rear side 5, i.e. the display element 22, the pivotable table 23 as well as the receiving element 24 are disposed in a centrally configured depression 27 relative to the width of the cladding element 7. This depression 27 has a longitudinal extension in the direction of a backrest 28 formed by the base frame 6 or the cover carrying frame 19. The configuration of the depression 27 makes it possible to configure or arrange the previously described components or the receiving space formed by the receiving element 24 according to the requirements in order to thus find sufficiency in this region or section of the seat 1 with a small overall installation depth.

Figure 4:
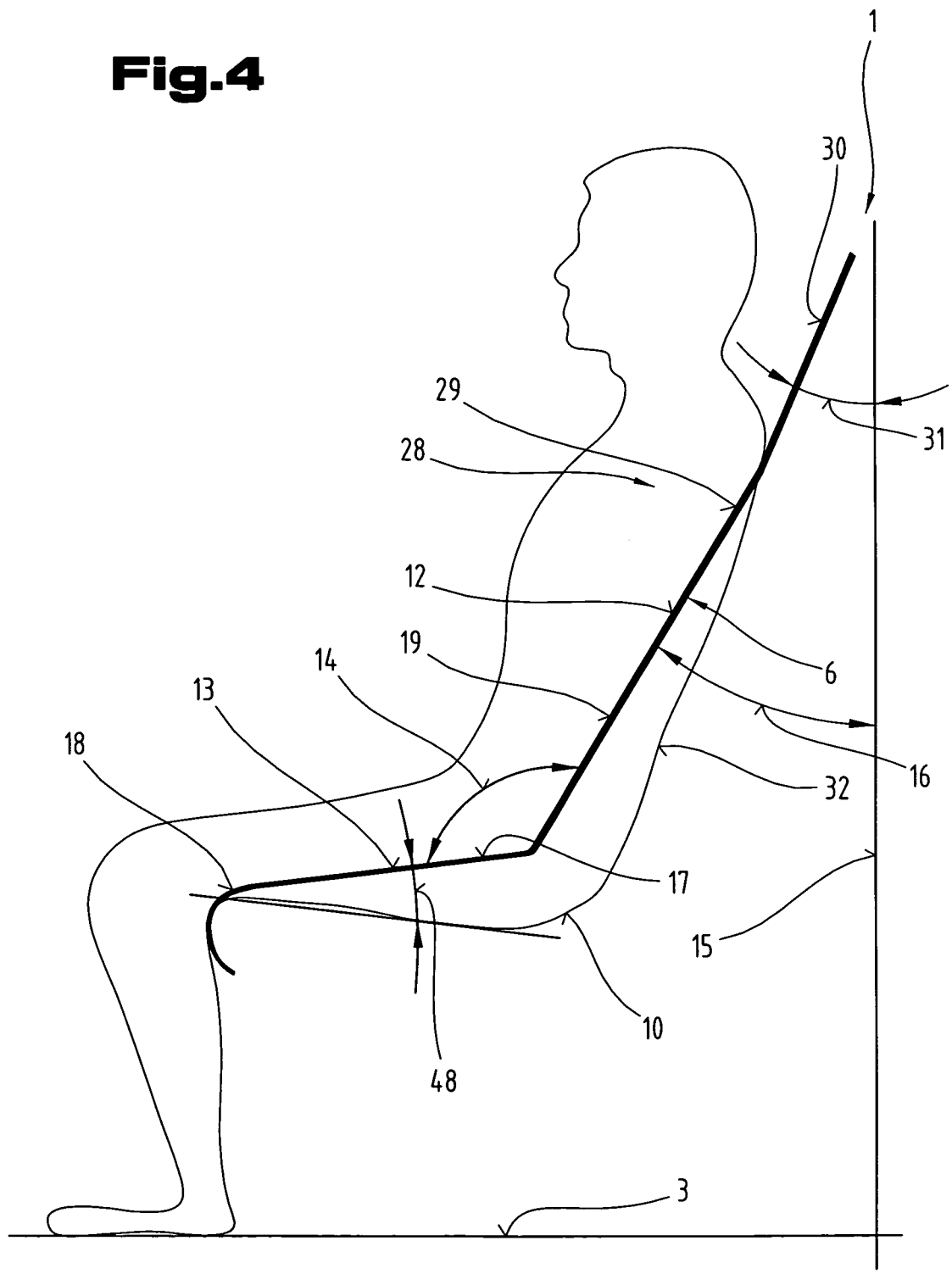
FIG. 4 shows a part of the seat from FIGS. 1 to 3 during use, in side view and highly simplified view.

FIG. 4 shows the seat geometry of the seat 1 in highly simplified schematic side view. The base frame 6 or the cover carrying frame 19 is shown simplified in the form of a thicker line, wherein in the unloaded state of the cover 10, said cover 10 approximately has the contour of the base frame 6 shown or the cover carrying frame 19.

In the region of the back rest 28 or its longitudinal profile, it is further shown that a shoulder region 29 facing the user and head region 30 is formed adjoining the back region 12. In the transition between back region 12 and the shoulder region 29, the base frame 6 or the cover carrying frame 19 has a kink with the result that a flatter angle 31 is formed between the head region 30 and the vertical 15 than the angle 16 between the back region 12 and the vertical 15. The longitudinal profile of the base frame 6 or the cover carrying frame 19 starting from the head region 30 as far as the thigh region 18 is selected in such a manner that in combination with the cover 10, in particular the seat textile or the knitted fabric 11, both an upright-sitting and also a slightly reclined positioning of the human body is made possible without needing to make an adjustment of the backrest 28. The kinked configuration in the region of the backrest 28 also serves to provide a large free space for the passenger in the row following and thus directs the rear edge of the seat 1 further away from said passenger. In addition, an optimised arrangement and starting position is also provided for the display element 22.

The seat position selected and shown in FIG. 4 shows schematically the profile of the base frame 6 or the cover carrying frame 19 as an example for the upright sitting position of the user. The cover 10 is further adapted by the loading of the user to his body contour 32 as is also shown in simplified form. This deformation of the cover 10 is possible due to its characteristic elastic properties. As has already been described previously, it is advantageous if the cover 10 is formed from the knitted fabric 11, wherein the cover 10 can also be designated as seat textile which can be fabricated as knitted fabric, for example, on a flat knitting machine.

The knitted fabric 11 forming the cover 10 here comprises a so-called single-piece knitted fabric 11, which forms continuously both the seat region 13, the back region 12 and the shoulder and head region 29, 30. As an unsupported structure, the knitted fabric 11 is fastened and pre-tensioned on the base frame 6 optionally with the cover carrying frame 19 interposed. In this case, the angle 14 between the seat region 13 and the back region 12 is selected to be considerably greater than in conventional seats in that position in which the backrest 28 is located in the so-called "upright position" for sitting upright. The flexibility of the knitted fabric 11 allows both straight upright sitting and also an approximately reclining position. However, an adjustment of the angle 16 between the base frame 6 and the vertical 15 is not necessary for this and is made possible by the elastic behaviour of the knitted fabric 11. The sitting comfort is achieved or adapted by various zones 33 to 38 in the region of the knitted fabric 11, described in detail hereinafter, which have different properties such as elasticities, stitch widths, stitch number etc. The individual zones 33 to 38 in the knitting direction are preferably arranged or configured symmetrically to the centre of the knitted fabric.

The strongly elastic zone 35 is located in the region of the main seat load, i.e. the buttocks region 17, to ensure that the user sinks into the cover. Further zones 33, 34 having lower elasticity support the back of the user in the region of the lumbar column and thoracic spine and also allow a certain sinking into the cover 10 in the region of the backrest 28. As a result of the selected stitch structure, the seat and/or rest surface contour is optimally adapted to the shape or form of the body of a user in the various usage positions. In the edge region the knitted fabric 11 is preferably executed as two-ply tubular and thus makes it possible to receive a beading in a known manner. A beading groove disposed in a corresponding manner in the cover carrying frame 19 and/or the base frame 6 receives the beading with the knitted fabric 11 and during usage as prescribed, ensures an optimal permanent connection between said frame and the knitted fabric 11. Compared to the geometrical external dimensions of the cover carrying frame 19 and/or the base frame 6, the knitted fabric 11 is preferably fabricated to be smaller in a variable relationship. This size difference between cover carrying frame 19 or base frame 6 and knitted fabric 11 thus produces the required pretension in the unused position of the cover 10. This pretension can act in the knitting direction, i.e. in the direction of longitudinal edges 41 and/or transversely to the longitudinal extension of the knitted fabric. If a pretension exists in both directions, a very taut holding of the knitted fabric 11 on the base frame 6 and/or cover carrying frame 19 is achieved.

The material described hereinafter used to form the knitted fabric 11 comprises so-called multifilament yarn made of high-strength polyester (PES) having a flame-retardant finish. In the elastic regions or zones, rubber threads (also having a flame-retardant finish) are added or individual PES threads are replaced by rubber threads. For a uniform colour visual effect of the knitted fabric 11, it is possible to spin the rubber threads with the corresponding PES thread. For example, high-strength polyester (PES) and/or Lycra can be used as thread material for the knitted fabric 11. The Lycra threads used can be spun with the corresponding PES thread for colour matching. All the materials used satisfy the ÖKO Tex Standard 100 and additionally have a flame-retardant finish. The thread made of the high-strength polyester (PES) can have the specification 167 dtex f36/1 and is distributed inter alia under the trade name "Trevira CS". The other thread made of the material Lycra has the specification 475 dtex with the trade name "Ultraelastic".

FIG. 5 shows in a simplified view the cover 10 made of the knitted fabric 11 having various zones 33 to 36 in a stretched flat position.

When viewed in the longitudinal extension of the cover 10, this diagram shows the head region 30 and following this the shoulder region 29 at the top. These form the first zone 33 for the head, neck and upper back. The second zone 34 for the lower back is located or formed following the second zone 33. The seat region 13 with the third zone 35 is located following this, this zone being used to support the buttocks region 17 and the thigh region 18. Finally the knitted fabric 11 of the cover 10 ends in the fourth zone 36 which forms a thigh support in the region of the back of the knee. The individual zones 33 to 36 can be more easily distinguished from one another due to different shadings. The geometrical arrangement and formation of the zones 33 to 36 is selected here, for example, for an abundance of possibilities, it being advantageous if the individual zones 33 to 36 lap or overlap in the longitudinal edge region 41 of the cover 10 as is shown here for example, between the zones 33 and 34 as well as 34 and 35. In this case, a mostly strip-shaped edge section 42; 43 of the respectively preceding zone 33; 34 at least overlaps the central region of the immediately following zone 34; 35. When viewed in the longitudinal extension of the cover 10, the lapping or overlapping edge section 42 extends as far as the dividing line between the second and third zone 34, 35 following the first zone 33. With its edge section 43 the second zone 34 overlaps the zone 35 following this likewise with a similar longitudinal extension as has been described previously for the edge section 42 of the first zone 33 and extends here approximately into the central region of the third zone 35. Transitions between the strip-shaped edge sections 42, 43 and the respective zone end running transversely thereto are preferably rounded in an arcuate shape. However, an angular or sharp-edged transition would also be possible. At the same time, the arrangement of a bevel as a transition would also be feasible.

In addition, however, it is also possible that further zones 37 and/or 38 can also be arranged or provided between the individual zones 33 to 36. Thus, for example, the fifth zone 37 is arranged between the first zone 33 and the second zone 34 and forms a so-called transition zone. This zone 37 when viewed in the transverse direction to the longitudinal extension of the knitted fabric only extends over the central region and ends before the longitudinal edge regions 41. A sixth zone 38 is arranged or formed here between the second zone 34 and the third zone 35. Due to this additional arrangement of the further zones 37 and/or 38, the supporting or sinking behaviour of the cover 10 can be adapted even more individually to various usage conditions. Equally, perceptible transitions between the highly loaded zones 33, 34; 34, 35 can thus be even better compensated or the transitions between the zones can be more finely matched to one another.

The seat textile forming the cover 10 is responsible in is functionality inter alia for the sitting comfort, the breathing activity, the back ventilation, the accommodation of the body mass and for supporting the sitting or inclined body. The previously described various different zones 33 to 38 are provided for optimal matching of the cover 10 to the various body contours of users and in order to optimally ensure their sitting posture, wherein these have different properties with respect to one another in relation to elasticity, stretching behaviour and so on. It is noted at this point that it is also possibly to insert or use both more or fewer than the previously described zones 33 to 38. Equally, the spatial configuration and arrangement with respect to one another is merely shown as an example for an abundance of possibilities.

Knitted fabrics having locally different properties in terms of force and/or stretching behaviour can be produced using the previously described flat knitting technique for producing the knitted fabric 11. The individual previously described zones 33 to 36 are described in detail hereinafter for the exemplary embodiment shown in FIG. 5.

The description relating to the manufacture of the knitted fabric 11 relates to a flat knitting machine of gauge E9 (this means nine needles per English inch) having a knitting width of preferably more than 200 needles, this depending on the knitting width to be produced. In the region of the zone 36, i.e. the knee region, the knitted fabric 11 is fabricated in a reduced width of preferably less than 200 needles and usually further decreasing. In principle, the knitted fabric 11 is fabricated in a single-bed knitting mode, wherein however, the previously described tubular edge is produced with a second needle bed. The different properties in the individual zones 33 to 36 or 37 and 38 can primarily be achieved by the type and number of the thread materials used, by different stitch sizes and different stitch numbers per knitted unit. One possible embodiment is described hereinafter for each of the zones 33 to 36 shown here.

In zone 33 only PES is used as thread material. The pretension of the entire knitted fabric 11 is achieved by the smaller width of the cover 10 or the textile compared with the width of the base frame 6 or cover carrying frame 19. In the transition zone from the first zone 33 to the second zone 34, a dynamic profile is implemented by systematically increasing mesh sizes. The contact surface under the headrest 21 and the shoulder in an inclined or resting sitting position is produced on the other hand with a smaller stitch length. As a result, a less elastic and therefore firmer and more taut cover is achieved. Possible characteristic values for the first zone 33 are:

| Material | PES 167dtex f36/1 |
| --- | --- |
|  | 8 threads per colour |
| Resistance to laddering | 11.8/12.0 |
| Fabric take-off | 10 |
| Zone length | About 270 knitting rows |
| Zone width | 200 needles |
| Strip tensile test according to DIN EN 13934-1 | $F_{max} > 1080$ N, and S < 95% |

In this strip tensile test, a knitted fabric width of 50 mm in the unloaded state with a clamping length of 200 mm was tested and stretched to breaking at $F_{max}>1080$ N. The strength in the strip tensile test according to DIN EN 13934-1 for this zone of the knitted fabric 11 should have a lower limit of 700 N and an upper limit of 1400 N.

The smaller the value given for the resistance to laddering, the firmer and more taut is the knitted fabric 11. At a higher value, the knitted fabric 11 is softer and more elastic.

As a result of the necessary or required sinking depth of the user in the seat 1, the greatest elasticity of the knitted fabric 11 is required in the second zone 34. This can be seen in simplified form from the diagram in FIG. 4. Lycra thread spun with PES is preferably used exclusively as thread material here. These elastic properties within the zone 34 can be specifically influenced by means of the number of individual threads used as well as the stitch size or stitch width. Possible characteristic values for the second zone 34 are:

| Material | Lycra (spun with PES) 2 threads first colour 1 thread second colour | PES 167dtex f36/1 8 threads per colour |
| --- | --- | --- |
| Resistance to laddering | 11.2/11.4 | 11.8/12.0 |
| Fabric take-off | 10 | 10 |
| Zone length | About 115 knitting rows | About 115 knitting rows |
| Zone width | 126-170 needles | 15-37 needles |
| Elasticity according to DIN EN 14704-1 | $F_{max} \approx 22$ N, at S = 100% |  |
| Strip tensile test according to DIN EN 13934-1 |  | $F_{max} > 1080$ N, and S < 95% |

In this strip tensile test, a knitted fabric width of 50 mm in the unloaded state with a clamping length of 200 mm was tested and stretched to twice its length at 400 mm. The force to be applied for this is about 22 N. A lower limit or a lower region of the tensile force is at most 10 N and an upper limit or an upper region is 40 N for the elongation of the test strip by 100%.

The further third zone 35 shown in FIG. 5 forms the seat region 13 and thus the seating surface of the seat 1. This seating surface should impart the impression of a complete continuous surface which is closed in itself, which is formed by the knitted fabric 11. Here the thread material can also be PES. In order to allow a "tilting" of the entire zone 35, highly elastic regions are additionally provided on the left and right longitudinal edge region 41 shown in FIG. 5, which are designated in FIG. 5 by the reference numeral 43 for the edge sections. When viewed in the longitudinal extension of the knitted fabric 11, these can be configured to be arbitrarily wide and optionally having different width. The edge sections 43 can have a wedge-shaped longitudinal profile. These therefore ensure a seating surface alignment of the seating contour or body contour 32 according to an angle of inclination 48—see FIG. 4—in relation to the base frame 6 or cover carrying frame 19 in the seating surface region, in particular the seat region 13. This angle of inclination 48 can be selected from an angular range having a lower limit of 5°, in particular 10°, preferably 15° and an upper limit of 45°, in particular 35°, preferably 20°. Possible characteristic values for the third zone 35 are:

| Material | PES 167dtex f36/1 8 threads per colour | Spun Elastane 2 threads per colour |
| --- | --- | --- |
| Resistance to laddering | 12.4/12.6 | 12.6/12.4 |
| Fabric take-off | 10 | 10 |
| Zone length | About 240 knitting rows | About 220 knitting rows |
| Zone width | 126-170 needles | 15-37 needles each |
| Strip tensile test according to DIN EN 13934-1 | $F_{max} > 1170$ N, and S < 96% |  |

In this strip tensile test, a knitted fabric width of 50 mm in the unloaded state with a clamping length of 200 mm was tested and stretched to breaking at $F_{max}$>1170 N. The zone 35 forming the seat region 13, in particular the seat surface should have a strength in the strip tensile test according to DIN EN 13934-1 having a lower limit of 800 N and an upper limit of 1500 N.

The details from the first column relate to the zone 35 shown in FIG. 5. The further details according to the second column relate to the two edge sections 43 formed in the longitudinal edge regions.

Finally, with the fourth zone 36, the seat region 13 or the seat surface of the seat 1 is defined by this zone in the direction of the knee region of the user. This zone 36 should prevent slipping out from the seat 1 along the longitudinal profile of the base frame 6 or cover carrying frame 19 from the seat region 13. The fourth zone 36 has a very high pre-tension in the transverse direction of the knitted fabric 11 which is also achieved by an additional reduction in the knitted fabric width of the knitted fabric 11 in the untensioned initial position. In this zone 36 PES is exclusively used as thread material. Possible characteristic values for the fourth zone 36 are:

| Material | PES 167dtex f36/1 |
| --- | --- |
|  | 8 threads per colour |
| Resistance to laddering | 11.7/11.7 |
| Fabric take-off | 10 |
| Zone length | About 90 knitting rows |
| Zone width | About 192 needles |
|  | (preferably decreasing) |
| Strength | Maximum, since the knitted |
|  | fabric is two-ply here |

In order to increase the strength of the fourth zone 36, the knitted fabric is configured to be two-ply here with the result that a type of threshold or wall against slipping out is created for the user.

The previously specified values relate to a knitted fabric size in the spanned state and stretched position in the longitudinal direction of the knitted fabric of about 500 mm width and about 1200 mm length.

Figure 7:
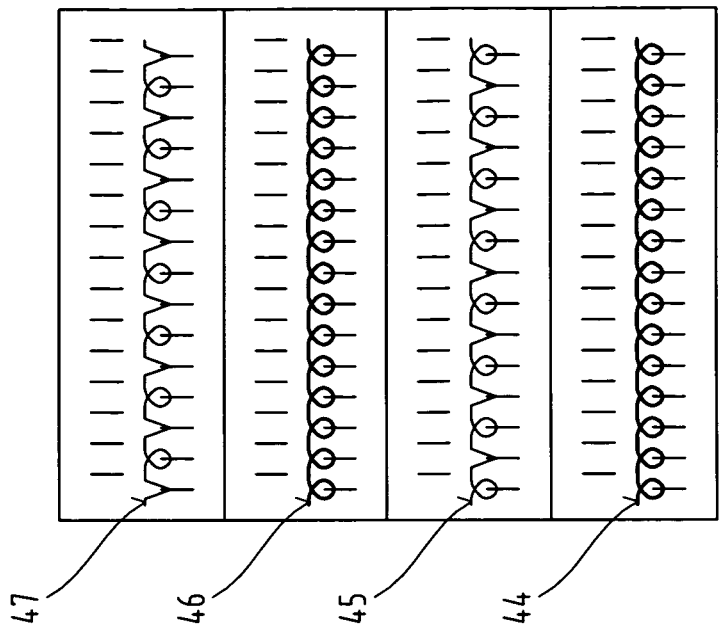
FIG. 7 shows another form of the diagram of the binding of the individual threads from FIG. 6—binding technology diagram.
Figure 6:
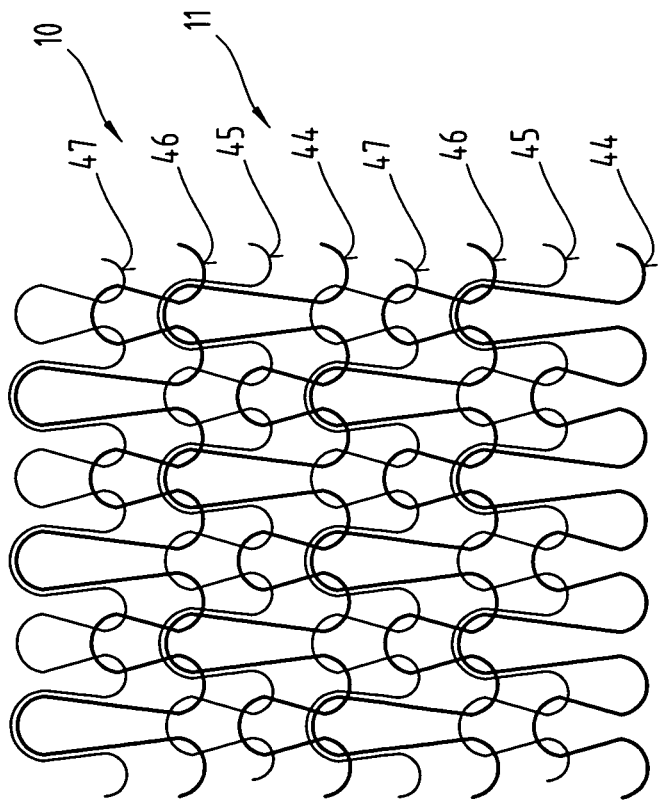
FIG. 6 shows a schematic simplified view of the binding view of the cover formed by a knitted fabric—schematic binding view.

FIGS. 6 and 7 show a schematic binding view of individual threads 44 to 47 and a binding technology diagram for one possible embodiment of the knitted fabric 11 in simplified view. In this case, all zone transitions and delimitations are configured to be dynamically running by suitably matched stitch sizes. A tube is knitted circumferentially in the edge region of the entire knitted fabric 11, which serves to receive a fastening means. This is preferably formed by a flat beading or a flat beading profile. The fastening means in conjunction with the knitted fabric 11 thus forms the interface or the holding between the base frame 6 or cover carrying frame 19 and the cover 10. In addition, in the region between the beading tube and the seat or backrest knitted fabric, it is possible to additionally reinforce this in the region of possible frame contact by knitting techniques in order to prevent any damage.

FIGS. 6 and 7 show the threads 44 to 47 for forming the knitted fabric 11. It should be noted that the knitting and thread profile of the individual threads 44 to 47 has only been selected as an example for a plurality of possible knitting designs and the knitting design can be adapted and varied to various usage conditions. Equally, the binding of the individual threads 44 to 47 among one another is also possible by means of thread profiles different from those shown here.

Figure 8:
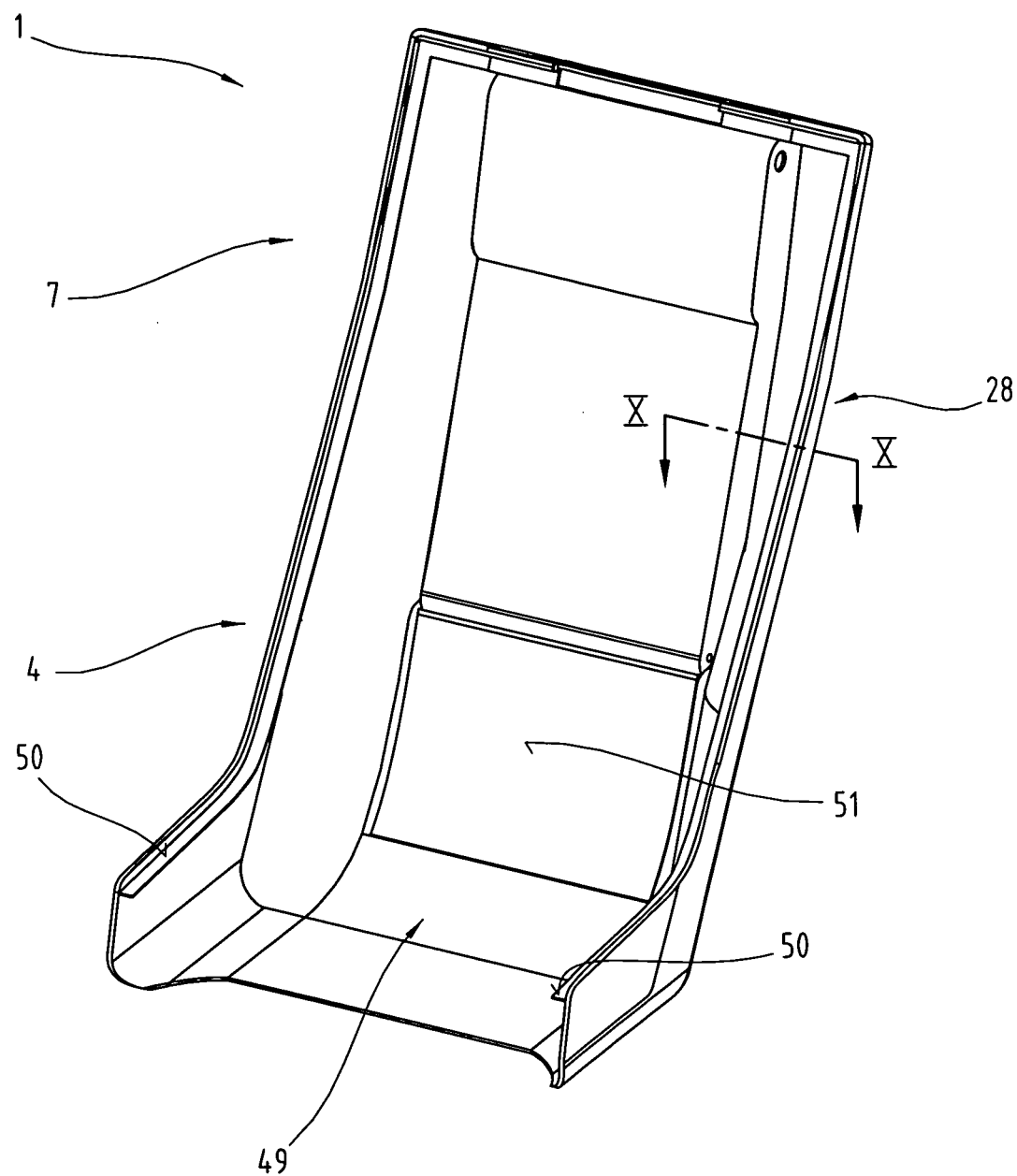
FIG. 8 shows the cladding element of the seat from the region of its rear side with the base frame removed and in a diagrammatic simplified view.
Figure 9:
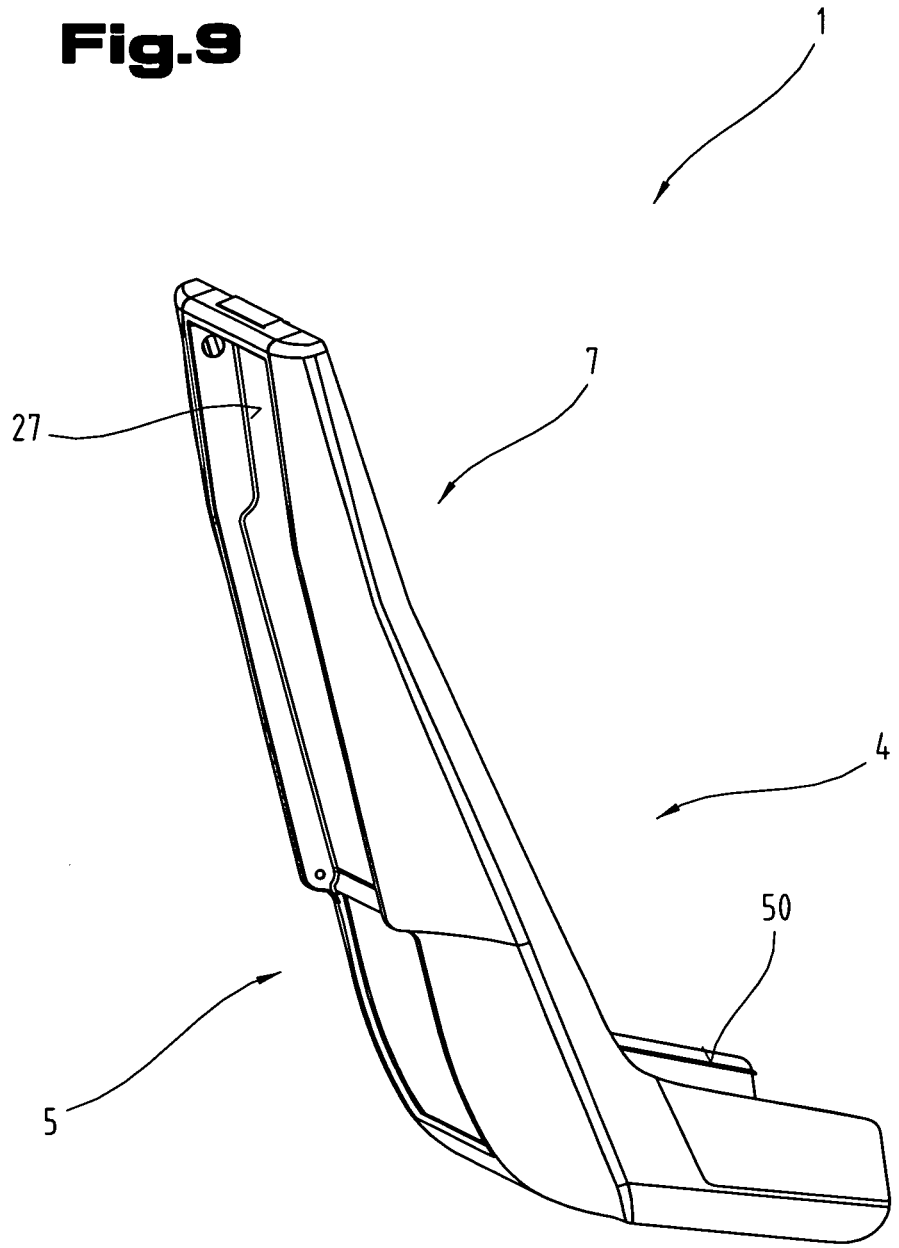
FIG. 9 shows the cladding element of the seat from FIG. 8 in a diagrammatic simplified view as well as a view of the rear side.

FIGS. 8 to 10 show a possible embodiment of the cladding element 7 for the rear side 5 of the seat 1, wherein in order to avoid unnecessary repetitions reference is again made to the detailed description in the preceding FIGS. 1 to 7. Equally the same reference numerals and component designations as in the preceding FIGS. 1 to 7 are used for the same parts.

The cladding element 7 shown here is preferably connected to the carrying frame 2 not shown here in detail to form an assembly and forms a receiving or support unit for the base frame 6 or cover carrying frame 19 as well as further components which have already been described previously. The cladding element 7 is preferably configured as a self-supporting, intrinsically rigid construction, wherein various shaping methods and materials can be used here. The material used here can be selected from the group of plastics, laminated and/or fibre-reinforced plastics, for example, with glass fibres, carbon fibres, metals, in particular light metals and so on. Equally however, any combination of different materials is possible. However, mats, braided fabrics, knitted fabrics or woven fabrics can also be embedded in the plastic or can be merely moulded thereon. The cladding element 7 can be fabricated by various manufacturing methods, wherein the shell-like structure preferably formed in this case is also used to remove the load from the user to the carrying frame 2. The shaping of the cladding element 7 also serves to determine the free space between seats 1 located directly behind one another. Otherwise, an undesirable body contact could take place between the users of seats 1 arranged one behind the other through the seat cover formed from the knitted fabric 11. Equally, however, the cladding element 7 will also serve as a carrying construction or for receiving the armrests 20, the head rest 21, the display element or elements 22, the table 23 and the receiving and retaining element 24, 25.

Since no adjustment of the base frame 6, in particular of the backrest 28 in relation to the vertical 15 needs to be made for changing the desired seat position between the two previously described seat positions, the base frame 6 and/or the cover carrying frame 19 can be accommodated in the cladding element 7 with a minimum of effort. On a receiving side 49 of the cladding element 7, support elements 50 are arranged on the user side 4 in the lateral edge region of the shell-like cladding element 7. The support element or elements 50 serve to support the base frame 6 which has already been described and will be described subsequently in further detail, for the removal of load. In this embodiment shown here, the base frame 6 serves to hold the cover 10 and if necessary is held detachably on the cladding element 7, in particular on the support element 50. As a result, it is easily possible for cleaning staff or service staff to remove dirty or damaged covers 10 together with the base frame 6 from the cladding element 7 and insert a new ready-pre-assembled cover 10 together with the base frame 6 into the cladding element 7 to complete the seat 1.

A receptacle or holder for the headrest 21 which is described in further detail subsequently is further provided in the region of the cladding element 7 shown here at the top. Various coupling devices for holding the display element 21, the table 22 and the receiving and retaining elements 24, 25 are provided in the centrally running depression 17 on the rear side 5 of the cladding element 7.

An inner surface 51 of the cladding element 7 is located in the region of the receiving side 49 at a distance from the cover 10 due to an intermediate space, as is shown in simplified manner in FIG. 10. This intermediate space between the cover 10 and the inner surface 51 of the cladding element 7 is used to receive the body of the user as is shown in simplified manner in FIG. 4 by the body contour 32.

This intermediate space also serves to absorb irradiated heat from the user which is emitted or released through the knitted fabric 11 simply into this space and can optionally also additionally be removed from there. Since the cover 10 is formed from the knitted fabric 11, this not only optimally supports the body of the user but also allows sufficient removal of heat and moisture and associated with this, good back ventilation of the entire seat 1.

Since the cover 10 formed from the knitted fabric 11 is selected as seat cover instead of hitherto usual seat cushions made of various foam plastics supported on a carrying structure, this intermediate space is to be provided between the cover 10 and the inner surface 51. In order to provide pleasant seating comfort even for heavier persons and to avoid the risk of the person contacting the inner surface 51 of the cladding element 7, it is possible to provide an intermediate layer 52 on the inner surface 51 of the cladding element 7. This intermediate layer 52 can be formed of a plastic foam at which, following corresponding deformation of the cover 10 by the user, said user comes to rest there.

This therefore prevents direct hard resting on the cladding element 7. This intermediate layer 52 can be adapted in terms of its properties to the various usage conditions. At all events, care must be taken to ensure that the foam plastic used preferably has a flame-retardant finish. This flame retardance can be effected in a known manner by various additions or admixtures in the foam framework. Impregnation or coating with flame-retardant materials as well as optionally a covering having a flame-retardant coating is also possible.

Independently of this, however, it would also be possible to provide one or more support belts 53 at predefined positions of the seat 1 inside the cladding element 7, which are disposed so that they run transversely to the longitudinal extension of the seat 1 or the longitudinal edge regions 41 inside the cladding element 7. This support belt 53 preferably has a lower elasticity than the cover 10 and serves to prevent contact with the cladding element 7, in particular the inner surface 51, in the event of too severe deformation of the cover 10 by the user in the extremely loaded regions of the seat 1. Thus, during use firstly the cover 10 is deformed or stretched to such an extent that the body contour 32 abuts against the support belt 53 and this subsequently acts to remove the support load of the user's body supportingly to the cover 10. For this purpose the support belt 53 should be configured with a preferably lower elasticity compared to the cover 10 in the direction of its longitudinal extension. A combination of the support belt 53 with the intermediate layer 52 is also possible in this case.

One of these support belts 53 can be disposed at the end of the thigh region 18 towards the back-of-the-knee region below the cover 10 on the base frame 6 and/or cover carrying frame 19. This serves to make it difficult or prevent the user from slipping out of the seat 1 during use. Thus, the already tautly configured knitted fabric 11 is additionally reinforced in the fourth zone 36.

In the region of the support element 50 disposed on the cladding element 7, FIG. 10 shows in a simplified manner an illuminant 54 disposed or held thereon. For better protection and holding the illuminant 54 can be disposed, for example, in a groove-shaped depression 55 of the support element 50. To this end, the illuminant 54 can be disposed adjacent to the base frame 6 and within its boundary. Furthermore, the illuminant 54 can, for example, be formed by a plurality of individual light spots or also by a fibre optic strand which is continuously configured and emits visible light. Since the knitted fabric 11 is formed by a plurality of stitches, in any case the emitted light from the illuminant 54 will shine through. The illuminant 54 can be disposed along the longitudinal edge region 41 or be disposed there. An arrangement running transversely thereto in the region of the headrest 21 and/or the knee region is however also possible. These illuminants 54 can, for example, serve to make his seat 1 more easily identifiable for the user in darkened passenger cabins. If a glass fibre cable, for example, is used as illuminant 54, this can be configured in such a manner that this delivers or emits light at its outer surface. The light can be supplied by means of a supply unit not shown in detail here which can be disposed or provided in the region of the carrying frame 2.

Figure 11:
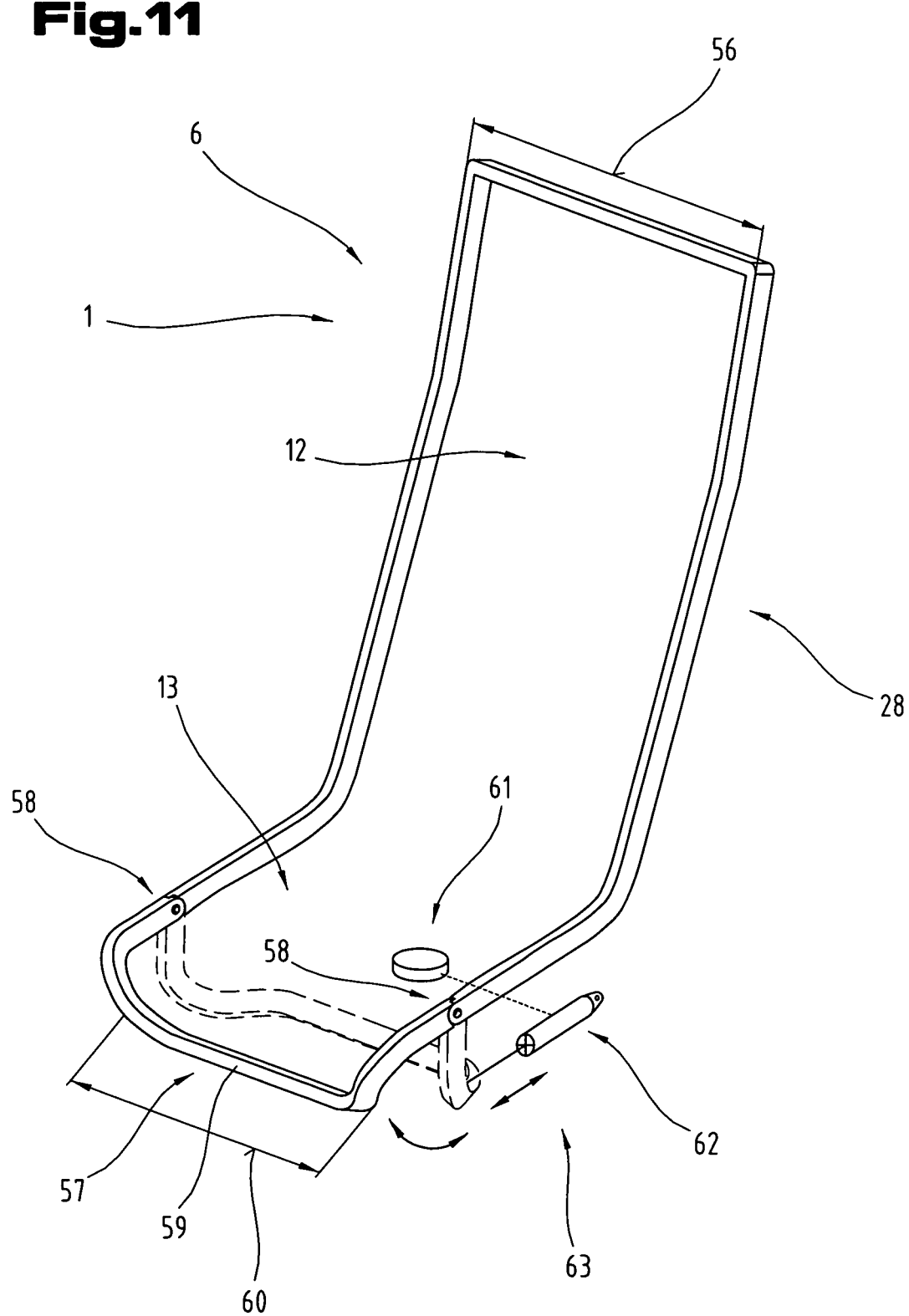
FIG. 11 shows the base frame of the seat in a diagrammatic simplified view.

FIG. 11 shows a possible configuration of the base frame 6 for forming the seat 1. As already described previously, the cover 10 can be spanned on this base frame 6. The base frame 6 is preferably formed from a light metal or a high-strength plastic material which has sufficient strengths to ensure load removal with sufficient stability. The section of the base frame 6 forming the backrest 28 has a uniform width 56 here over its entire longitudinal profile. As a result, the shaping of the cladding element 7 is also simplified and interfering free spaces when seats 1 are arranged immediately adjacent to one another are avoided. The width 56 corresponds to the usual seat dimensions or minimum dimensions for the respective case of usage.

As already described previously, the front seat section 57 of the seat region 13 is configured to be adjustable for shortening the seat surface. In order to be able to make this adjustment, a linkage arrangement 58 is provided in each case on both sides of the seat region 13 of the base frame 6. With this arrangement it is possible to pivot a frame part 59 from its usage position into its readiness position. This folding down effects a shortening in the length of the seat region 13, wherein however it is always possible to sit down on this remaining residual surface. The folded-down position is shown by dashed lines.

In order to allow a pivoting of the pivotable frame part 59 inside the cladding element 7, this has a smaller width 60 compared with the width 56 of the remaining base frame 6. The view of the folded-down seat section in the so-called readiness position has already been shown and described in FIG. 2. The folded-up position and therefore the usage position of the seat 1 has been shown and described in FIG. 1.

In order to avoid the user having to deliberately initiate an actuating process in order to execute the adjustment of the upper seat section 57, this should be automated and take place automatically. To this end, the weight force introduced by the user into the seat region 13 should constitute the time point at which the adjusting movement and thus the folding up of the front seat section 57 into the usage position takes place. Thus, when the user takes a seat on the seat 1, the cover 10 undergoes a deformation. This taking a seat or sitting down is registered by a detection device 61 shown in simplified form in the seat region 13. This detection device 61 can be formed by a sensor system, for example, by mechanical or electronic methods. Furthermore, the detection device 61 is in line connection with an adjusting device 62, likewise shown in simplified form, which for its part is connected to the pivotable or adjustable front seat section 57. At this point it should be noted that the detection device 61 shown and adjusting device 62 are only represented in schematically simplified form and can be formed by any components or devices known from the prior art. The detection device 61 and the adjusting device 62 operatively connected thereto form an actuating device 63 for the seat section 57.

For example, various cylinders, stepping motors, electrical, pneumatic or hydraulic actuators and so on, can be used as components for forming the adjusting device 62. The operative connection between the detection device 61 and the adjusting device 62 can also be effected by various media such as, for example, mechanical, electrical, pneumatic, hydraulic and so on.

If the detection device 61 has now registered a user sitting down on the seat 1, the adjusting device 62 is activated, and executes the pivoting movement of the seat section 57 from the folded-down position into the normal usage position. As a result of this pivoting upwards, the seat region 13 is lengthened, providing even better support of the thigh region as far as the back-of-the-knee region for the user sitting on the seat 1.

When the user leaves the seat 1 and gets up from said seat, this is likewise registered by the detection device 61 and the seating surface of the seat region 13 is automatically reduced, thus making possible a larger free space for leaving the seat 1 or the row of seats formed therefrom.

FIG. 12 shows another possible and optionally per-se independent embodiment of the seat 1, in particular the holding of the cover 10 on the cladding element 7. In order to avoid unnecessary repetitions, reference is made to the detailed description in the preceding figures. Equally, the same reference numerals and component designations as in the preceding FIGS. 1 to 11 are used for the same components.

The view of the partial region of the seat 1 shown in FIG. 12 corresponds to the view according to FIG. 10 described previously in detail. In contrast to this, the arrangement of the support element 50 for holding the base frame 6 is omitted here.

In the exemplary embodiment shown here, the base frame 6 is connected to the cladding element 7 to form the support unit 8, with the result that sufficient intrinsic stiffness of this assembly can be achieved. The support element 8, in particular the cladding element 7, is in turn connected to the carrying frame 2 not shown here in detail to form the seat 1.

The cover 10 is spanned on the cover carrying frame 19. This in turn provides the possibility of being able to easily remove the cover 10 jointly with the cover carrying frame 19 from the support unit 8 for the purpose of cleaning or replacing the support unit 8 and of being able to mount it again. Thus, the cleaning or service staff can rapidly change the cover 10, wherein the cleaning or the changing of the cover 10 takes place at a dedicated located remote from the seat 1. The cover carrying frame 19 in turn has suitably configured retaining devices for fastening the cover 10. Since in this exemplary embodiment the cover carrying frame 19 is supported on the base frame 6 of the support unit 8 in its mounted position, this can be designed to be smaller than the base frame 6 in its stability and dimension.

In order to be able to fasten the cover carrying frame 19 easily on the base frame 6 and hold it there, it is advantageous if the base frame 6 has a recess 64 on the side facing the side wall of the cladding element 7 in which the cover carrying frame 19 can be inserted from the user side. For the sake of better clarity, dedicated fastening means between the base frame 6 and the cover carrying frame 19 were not shown.

Furthermore, it is also shown in simplified form that illuminants 54 can again be disposed or provided in the base frame 6, these being disposed in the depression 55. In order to avoid any contact or touching of the illuminant 54 with a user in the position located on the seat 1, the illuminant 54 or its holder is located at a distance from the cover 10 in the direction of the inner surface 51 of the cladding element 7.

In order to allow a variation of the supporting force generated by said belt for the additionally provided support belt 53, this is assigned an adjusting device 65 shown here in simplified form in the region of the base frame 6 or cladding element 7. This adjusting device 65 can, for example, be provided only at one end of the support belt 53 or at both ends of the same. For the sake of better clarity, the actuation of the adjusting device 65 was not shown, this being freely selectable according to the known prior art. Due to the arrangement of the adjusting device 65, it is possible to vary the distance between the support belt 53 in the unloaded position relative to the cover 10. If the distance is reduced, that distance by which the cover 10 can be deformed due to use as far as the support belt 53 before the support belt 53 takes over the further supporting action is also reduced. The shorter is this deformation distance, the more rapidly the support belt 53 comes into action, with the result that the supporting behaviour of the seat 1 can be individually matched to the user. The shorter the distance and the more taut the support belt 53 is configured to be, the firmer and harder is the seating sensation.

Figure 13:
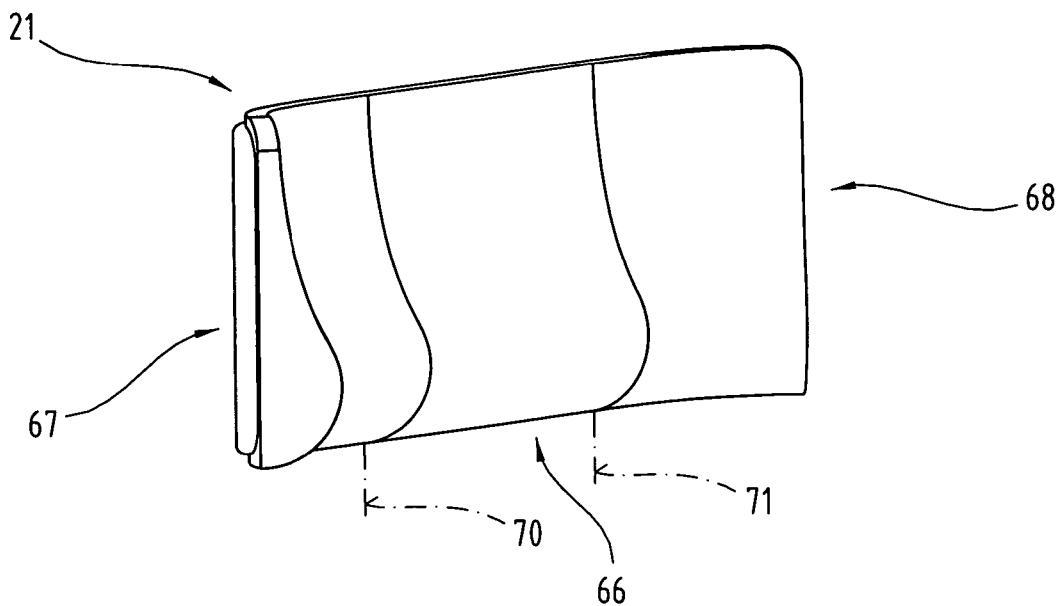
FIG. 13 shows a possible embodiment of the headrest for the seat in a view from the user side and simplified diagrammatic view.
Figure 14:
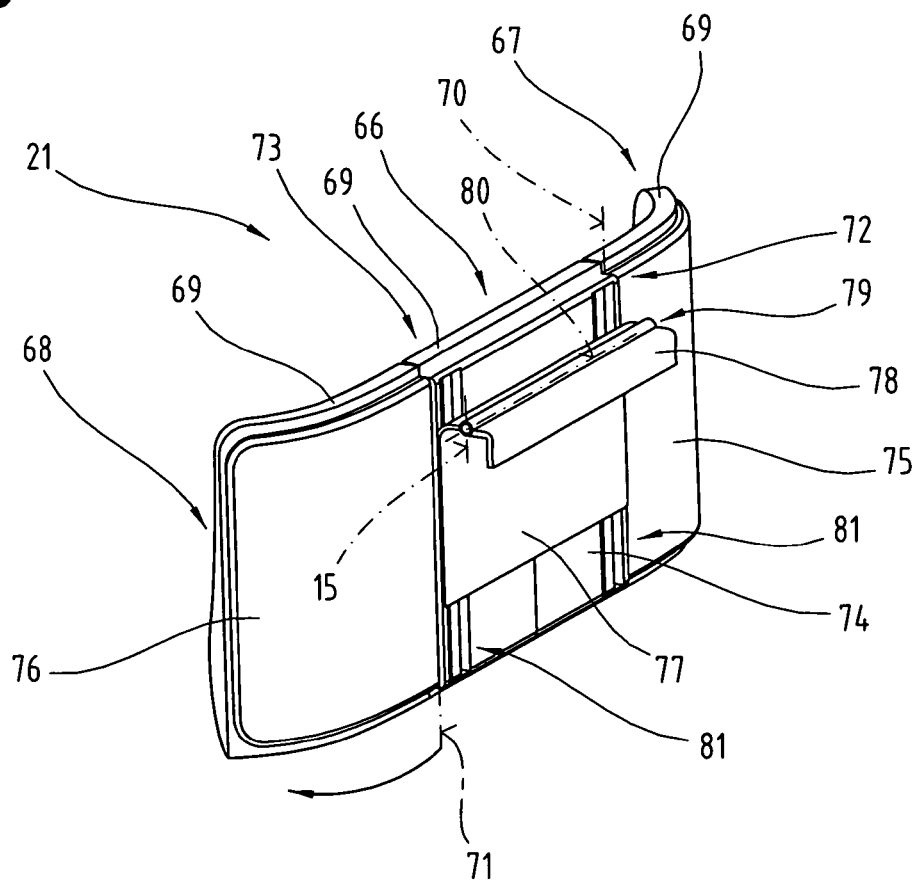
FIG. 14 shows the headrest from FIG. 13 in a view of its rear side, in simplified schematic view.

FIGS. 13 and 14 show the headrest 21 for the seat 1, wherein this by itself can optionally constitute an independent solution according to the invention. The same reference numerals and component designations as in the preceding FIGS. 1 to 12 are used here for the same components. Equally, in order to avoid unnecessary repetitions, reference is made to the detailed description in the preceding FIGS. 1 to 12.

The headrest 21 is disposed in the upper region of the cladding element 7 or the support unit 8 and preferably couplably connected to the cladding element 7. In the exemplary embodiment shown here, the headrest 21 comprises a central part 66 as well as lateral parts 67, 68 disposed on both sides thereof and connected to said central part. Upholstery 69 shown in simplified form is preferably disposed on the side facing the user for supporting the head. The two lateral parts 67, 68 are pivotally mounted by means of approximately vertically aligned pivot axes 70, 71 of linkage arrangements 72, 73, in each case in the normal usage position according to the indicated arrows. As a result, it is possible for the user of this headrest 21 to pivot the two lateral parts 67, 68 laterally of the central part 66 in the direction of the user's head to thus achieve a shell-shaped support. As a result, the temple region of the head can also be conveniently supported on the headrest 21 in the rest position.

The upholstery 69 of the headrest 21 is held on preferably flat-configured carrying elements 74 to 76. These carrying elements 74 to 76 form the basic framework of the headrest. The two linkage arrangements 72, 73 for the pivotable mounting of the two lateral parts 67, 68 are thus disposed between the carrying elements 74 and 75 or 74 and 76 and can be configured as hinge-like. In order on the one hand to achieve sufficient stability for the support of the pivoted lateral parts 67, 68 and on the other hand, to nevertheless allow a pivoting movement relative to the central part 66, the two linkage arrangements 72, 73 should be suitably matched to said part.

For adjustment of the entire headrest 21, a carrying arrangement 77 on the side facing away from the user is assigned to the carrying element 74 of the central part 66. This carrying arrangement 77 serves to connect the headrest 21 to the cladding element 7 and/or the base frame 6 and/or the support element 50. For this purpose, the carrying element 77 comprises at least one coupling element 78 which is connected to one of the components of the seat 1 or held thereon. A further linkage arrangement 79 is provided between the coupling element 78 and the carrying arrangement 77 by which means the carrying arrangement 77 and subsequently the central part 66 with the lateral parts 67, 68 disposed thereon is pivotable relative to the vertical 15. The linkage arrangement 79 has a pivot axis 80 which is preferably aligned horizontally, that is parallel to the standing surface 3 and parallel to the support surface 9 formed by the cover 10.

Due to the pivot axis 80 of the linkage arrangement 79, a further additional alignment and matching of the entire headrest 21 to the desires of the respective user can be achieved. The further pivot axis 80 is preferably located directly adjacent to, but also in front of, the support surface 9 formed by the cover 10. This has the result that the section of the headrest 21 facing the seat region 13 can be pivoted into the cover 10. This achieves a flowing transition from the loaded cover 10 towards the headrest 21.

In order to be able to adjust the headrest 21 to different sizes of users, at least one but preferably a plurality of guide arrangements 81 is further provided here between the carrying arrangement 77 and the carrying element 74 of the central part 66. These guide arrangements 81 allow the complete adjustment of the headrest 21 in the longitudinal direction or longitudinal extension of the backrest 28. This adjustment makes it possible to vary the distance between the cover on the headrest 21 and the support surface 9 in the seat region 13. The guide arrangement 81 can be configured as a longitudinal guide and is preferably disposed at edge regions of the central part 66 which are assigned directly adjacently to the lateral parts 67, 68.

It is further possible to dispose or provide further additional elements or components such as loudspeakers, light applications and so on in the region of the lateral parts 67, 68 and/or the central part 66. These can be installed as desired depending on the required seat finish and the associated seating comfort of the seat 1.

Figure 15:
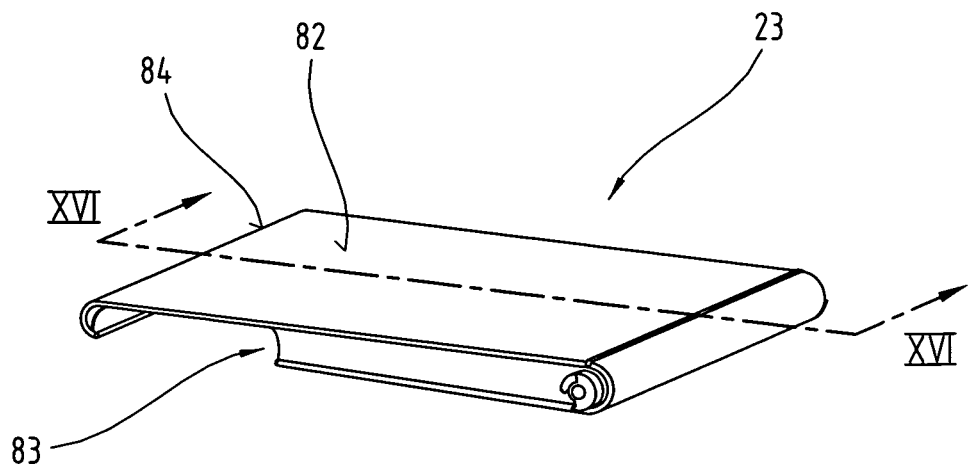
FIG. 15 shows a possible embodiment of a table in diagrammatic simplified view.
Figure 16:
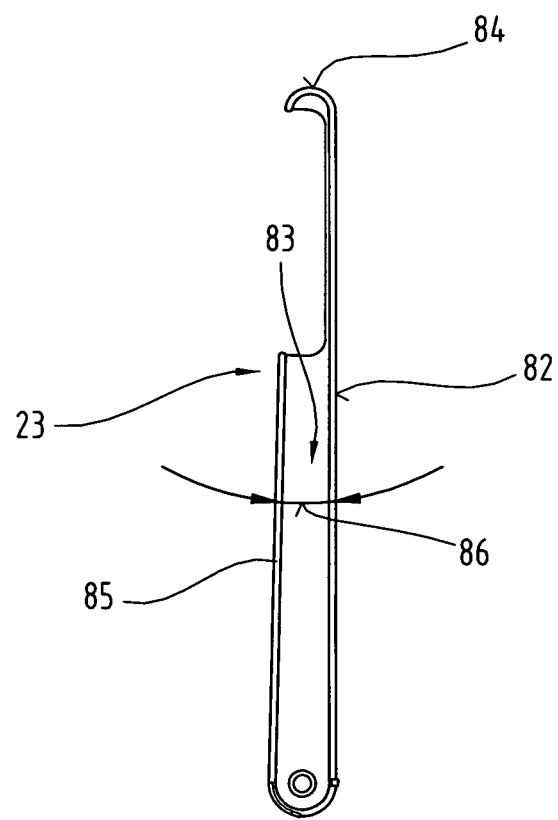
FIG. 16 shows the table from FIG. 15 in cutaway view along the lines XVI-XVI in FIG. 15.

An optionally independent embodiment of the table 23 per se is shown in FIGS. 15 and 16, wherein again the same reference numerals or component designations as in the preceding FIGS. 1 to 14 are used for the same parts. In order to avoid repetitions, reference is made to the detailed description in the preceding FIGS. 1 to 14.

In the position located in the usage position, the table 23 has a table surface 82 facing the user and provided for placing various items. A corresponding linkage arrangement is provided to be able to pivot the table 23 between the usage position in the approximately horizontal position and that position folded into the depression 27.

A receiving compartment 83 is additionally provided on the side of the table 23 facing away from the table surface 82. As can be seen in the folded-up position of the table 23 shown in FIG. 16, the table surface 82 of the table 23 is facing away from the user of the following seat and the receiving compartment 83 is facing said user. A front side 84 of the table 23 facing the user in the usage position has a rounding or a gripping recess formed thereby for easier actuation and for reinforcement of the table surface 82. On the side facing away from the table surface 82 the receiving compartment 83 is delimited by a compartment wall 85. In order to avoid any falling out of items inserted in the receiving compartment 83 in the usage position, that is the folded-down position of the table 23, the compartment wall 85 is aligned to that it runs at an angle to the table surface 82. An angle 86 between the table surface 82 and the compartment wall 85 is thereby aligned so that it tapers in the direction of the front side 84. This convergence of the compartment wall 85 relative to the table surface 82 avoids any falling out of items stored in the receiving compartment 83 during the folded-down position of the table 23. Since the entire support unit 8 is fixed in its position relative to the standing surface 3, the alignment of the table surface 82 relative to the vertical 15 can be approximately horizontal. The table surface 82 is preferably aligned parallel to the standing surface 3 in its usage position. In this case, the compartment wall 85 is then inclined in the direction of the rear side 5 of the seat 1 relative to the sanding surface 3.

Returning to the diagram in FIGS. 1 to 3, it should also be noted that in the region of the rear side 5 of the seat 1 in the region of the receiving element 24 and/or the retaining element 25, it is also possible to provide or dispose an illumination means 87. The illumination means 87 can be disposed or configured in such a manner that the free space located underneath the seat 1 is illuminated in the darkened passenger cabin. The supply unit for this illumination means 87 can again be disposed or provided in the region of the carrying frame 2.

Furthermore, it is also possible to design the receiving element 24 and the retaining element 25 in one piece, wherein the longitudinal extension for receiving the items preferably extends over the entire width 56 of the seat 1. This combination of receiving element 24 and retaining element 25 can also be formed from a knitted fabric and suitably connected to the cladding element 7.

Figure 17:
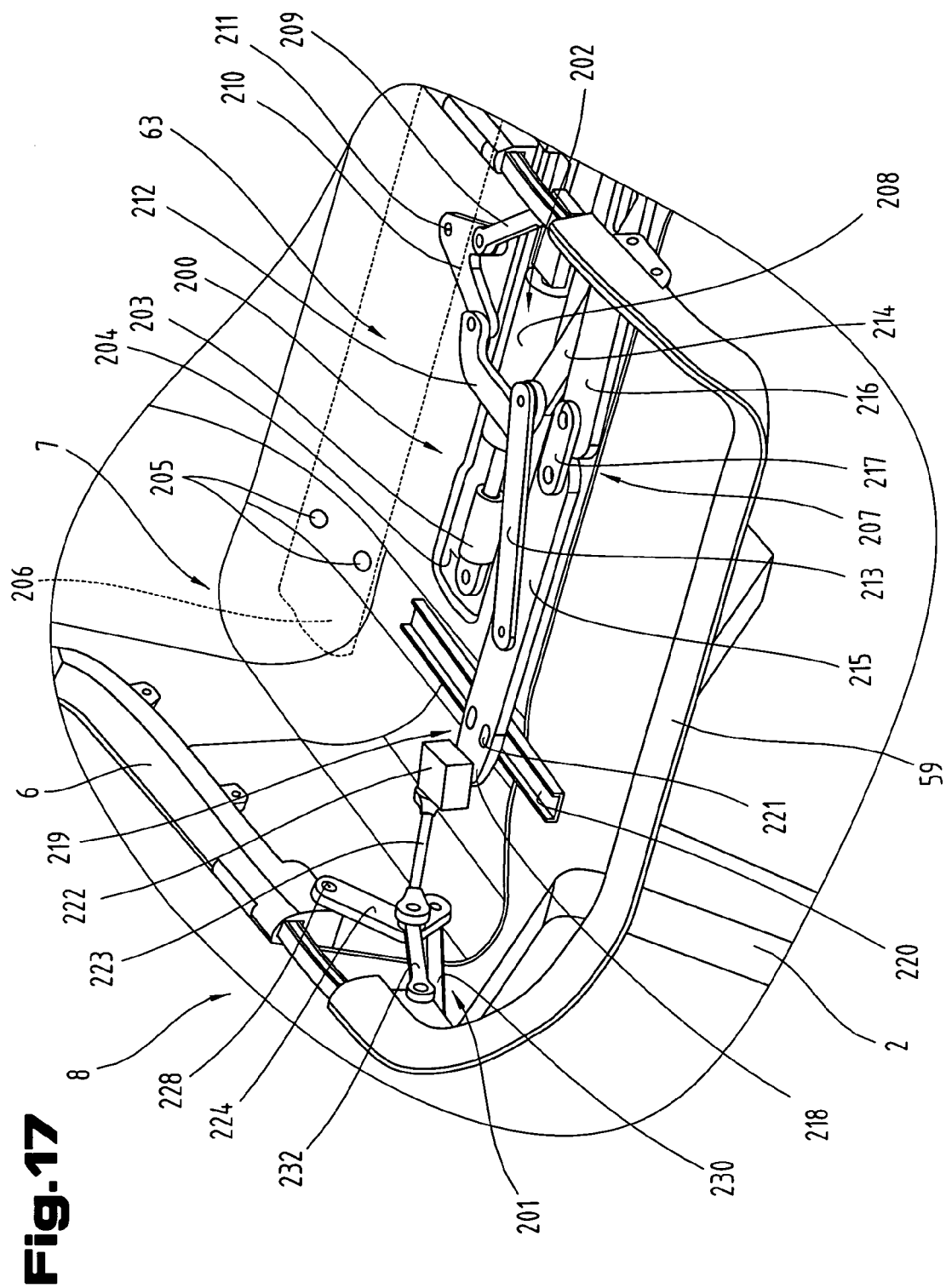
FIG. 17 shows a part of the seat from FIGS. 1 to 3 in the seat region and another embodiment of the adjusting mechanism according to FIG. 11, in highly simplified schematic view.
Figure 18:
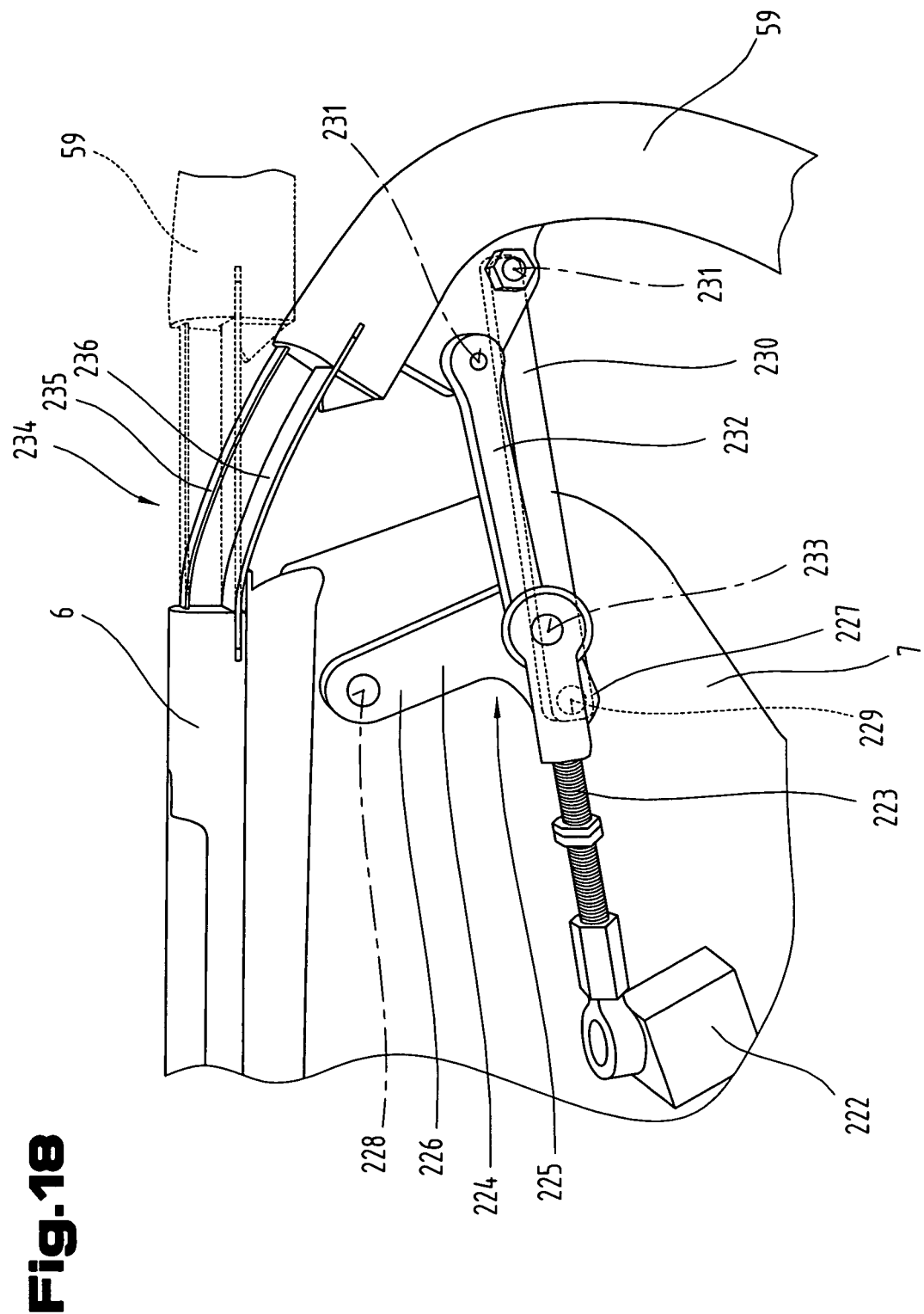
FIG. 18 shows a schematic diagram of the adjusting mechanism for the pivotable frame part in highly simplified schematic view.
Figure 19:
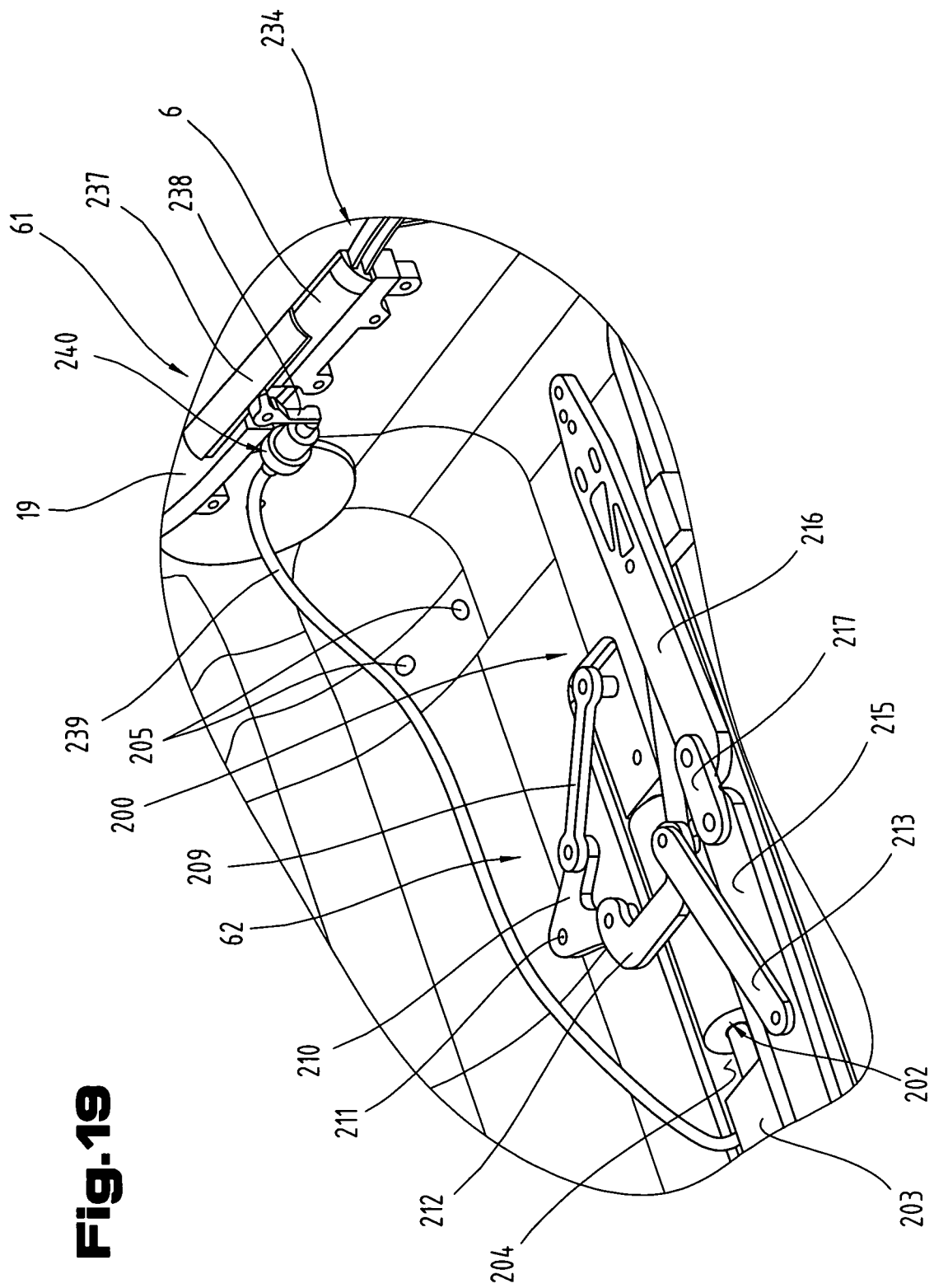
FIG. 19 shows another partial region of the seat from FIGS. 1 to 3 with the actuating device of the adjusting mechanism of the adjustable frame part in a highly simplified schematic view.

FIGS. 17 to 19 show a further embodiment for the mounting, adjustment and actuation of the pivotable frame part 59, as has been described previously in FIG. 11.

FIG. 17 shows the support unit 8 and a part of the base frame 6 and cladding element 7 in the seat region 13 as well as a part of the carrying frame 2.

The adjusting device 62 with a transmission device 200 assigned thereto and a parallelogram lever arrangement 201 mounting the pivotable frame part 59 is shown in the part of the cladding element 7 underneath the seat region 13.

In the present exemplary embodiment, the adjusting device 62 is formed by a force storage device 202, for example, a gas spring or a compressed fluid element. The force storage device 202 further comprises a remotely triggerable locking device 203. Furthermore, the force storage device 202 is disposed recessed in a depression 204 or a recess of the cladding element 7. The depression or recess is preferably arranged in the cladding element 7 in such a manner that the force storage device 202 is aligned transversely to the seat depth of the seat 1. However, it is also possible to arrange the force storage device 202 in the direction of the seat depth or in a position running obliquely thereto.

The cladding element 7 is usually connected to a central support 206 of the carrying frame 2, which is merely indicated, by means of two fastening means 205 shown in simplified form in the transition region between the seat region 13 and the back region 12 such as, for example, high-strength screws. The end of the safety belt facing the cladding element 7 is preferably anchored with the fastening means 205 located closer to the back region 12.

In the arrangement of the force storage device 202 perpendicular to the seat depth, it is advantageous if this recess or depression is provided between the adjustable frame part 59 and the central support 206 mounting the cladding element 7 which is also disposed transversely to the seat depth on the side of the cladding element 7 facing the carrying frame 2.

In this exemplary embodiment, the transmission device 200 is formed by a multilever arrangement 207.

In the present exemplary embodiment, the adjusting device 62 is fixedly connected to the cladding element 7 or the central support 206 in the region of its piston-rod side end in which the locking device 203 is also expediently located in the present case. One cylinder 208 of the force storage device 202 is mounted relatively displaceably in the depression 204 and its end facing away from the piston-rod side end is connected via control arm 209 to a toggle lever 210 which is pivotable in its kink region about an articulation axis 211 fixedly anchored in the cladding element 7.

The further lever arm not connected to the control arm 209 is pivotably connected to a deflection lever 212. In the end region of the deflection lever 212 opposite to the toggle lever 210, said lever is connected in an articulated manner to two control levers 213, 214.

At their end regions facing away from the deflection lever 212, these control levers 213, 214 are pivotally connected to swivel arms 215, 216 in an articulated manner.

The two swivel arms 215, 216 aligned substantially transversely or obliquely to the seat depth are pivotally mounted independently of one another in a fixed bearing 217 in their end regions facing one another and closely adjacent to one another.

The end regions 218 of the swivel arms 215, 216 facing away from this fixed bearing 217 are displaceably mounted in sliding shoes 219 which run along guide rails 220 in the direction of the seat depth. The sliding shoes 219 are guided in elongate holes 221 running in the longitudinal direction of the swivel arms 215, 216.

In the end region 218 a connecting lever 223 extending substantially in the direction of the seat depth is pivotally mounted about an axis running transversely to the seat depth by means of a bearing block 222 which can be formed by the sliding shoe 219.

An angle lever 224 is articulated on the end of the connecting lever 223 facing away from the bearing block 222 as can be seen more clearly from FIG. 18. The articulation point is located in a notch region 225 of the angle lever 224.

The angle lever 224 for its part has two legs 226, 227, one leg 226 being aligned approximately obliquely to the seat region 13 whilst the leg 227 extends substantially in the direction of the seat depth. The angle lever 224 is pivotally mounted at the free end of the leg 226 on a pivot axis 228 running transversely to the seat depth.

This pivot axis 228 or its bearing point can be disposed or anchored on the base frame 6 or on the cover carrying frame 19 or on the carrying frame 2 and/or on the cladding element 7. The pivot axis 228 for the pivotable frame part 59 is disposed eccentrically in the direction of the floor-side carrying frame 2 in relation to the longitudinal extension of the base frame 6 and/or the cover carrying frame 19.

An axis of rotation 229 is provided at the opposite free end of the leg 227 on which a parallelogram lever 230 is disposed adjustably, in particular pivotably. The other free end of this parallelogram lever 230 is rotatably mounted on the frame part 59 on an articulation axis 231.

In order to form the parallelogram lever arrangement 201, another parallelogram lever 232 is provided, this being connected with one free end to the pivotable frame part 59 via a further articulation axis 231. Its other end region is rotatably mounted in an articulated manner, for example, on an axis of rotation 233 in the notch region of the angle lever 224. This axis of rotation 233 can preferably mount both the parallelogram lever 232 and also the connecting lever 223. However, separate axes of rotation 233 can also be provided for these two levers.

For further guidance and connection of the pivotable frame part 59 to the base frame and/or cover carrying frame 6, 19 and for guidance of the cover 10 in this transition region, there is provided at least one transition element 234 which is telescopically aligned and is telescopic and/or elastically deformable in the direction of the longitudinal extension of the base frame 6 and/or the cover carrying frame 19.

This transition element 234 is preferably elastically deformable transversely to the longitudinal extension. It has proved to be particularly advantageous if this elastic deformability of the transition element 234 is only provided for deformations in the direction running approximately perpendicularly to the seat region 13 whereas the transition element 234 should be flexurally rigid or at least torsionally rigid in the direction running transversely to the seat depth.

Any means known from the prior art such as, for example, elastically deformable plastic elements, belts, levers and so on can be used to form the transition element 234. However, it is also possible to form the transition element 234 by spring bar. This spring bar can, for example, consist of a leaf spring or be formed from a helical spring or deformable hoses or pipes having interior elastically deformable elements. In the arrangement of a leaf spring, the broad side of the leaf spring is aligned approximately parallel to the seat region 13.

Thus, as can be seen in particular from the diagram in FIG. 18, during the movement of the pivotable frame part 59 from the pivoted-in rest position shown by solid lines (in the position not used by a person) into the extended or pivoted-out position shown by dashed lines, the leaf spring can be deformed when used by a flight passenger or passenger. In this case, the leaf spring is deformed from the originally curved into an approximately stretched position. The advantage of the elastically deformable transition element 234 or the spring bar is that the cover 10 freely suspended exclusively on the base frame 6 or cover frame 19 is guided and held in a load-bearing manner by means of this articulated transition region between the base frame 6 or cover carrying frame 19 and the pivotable frame part 59.

At the same time, it can prove advantageous if these transition elements 234 or leaf springs and helical springs are configured to be independently elastically restorable.

Preferably, as can be seen from FIG. 18, two such spring bars or transition parts 235, 236 are provided which are disposed in a direction running approximately perpendicularly to the seat region 13. Thus, problem-free gentle guidance of the cover 10 in this region can be ensured even with varying angular position of the frame part 59 to the base frame 6 or cover carrying frame 19.

As can be seen more clearly from FIG. 19, the detection device 61 is provide in the deformation region of the cover 10 between the base frame 6 or cover carrying frame 19 and the pivotable frame part 59. With this detection device 61 it is possible to determine whether the cover 10 is located in a position loaded by a user or in an unloaded position.

The detection device 61 can preferably comprise an activation element 237 which is arranged in the region of the base frame 6 or the cover carrying frame 19 and which is adjustable relative to these or the cladding element 7. This can be disposed between the base frame 6 and/or the cover carrying frame 19 or the cladding element 7 as well as the user side 4 of the cover 10.

The important thing here is that the arrangement relative to the cover 10 is made in such a manner that when the cover 10 is loaded by the user, a compressive force or adjusting force directed substantially obliquely to the cladding element 7 is exerted. It would thus, however, also be possible to connect the activation element 237 directly to the cover 10 and use the deformation of the cover 10 with respect to a fixed reference point as triggering force for actuating the activation element 237.

In the present exemplary embodiment the activation element 237 is adjustably mounted in a recess of the base frame 6 substantially perpendicularly to the seat region 13. The activation element 237 is in this case located on the upper side of the base frame 6 or cover carrying frame 19 facing the arms of a user of the seat 1. The activation element 237 for its part is connected in an articulated manner to an angle lever 238 which is pivoted in the direction of the seat depth in the event of the activation element 237 being activated, i.e. a compressive force being exerted in the direction of the seat region 13. The angle lever 238 with a Bowden cable 239 forms a transmission element 240.

It is also possible that the transmission element 240 can also be formed by any other mechanical or fluid-technical elements or electrical sensors, adjusting motors or the like. In the present case where the activation movement of the activation element 237 is transmitted purely mechanically to the adjusting device 62 of the actuating device 63 or its locking device 203, the angle lever 238 is provided with the Bowden cable 239. The adjusting device 62 jointly with the transmission device 200 forms the actuating device 63.

The control sequence for the automatic extension of the pivotable frame part 59 from the rest position shown by the solid lines in FIG. 18 into the usage position indicated by the dashed lines is now as follows.

In principle, on leaving the seat 1 or when preparing the seat 1 for the next use, the pivotable frame part 59 is pivoted by the user himself or service staff into the rest position shown by the solid lines in FIG. 18.

Thus, in vehicles with a short distance between the individual rows of seats in the direction of the seat depth, additional movement space for the passengers is achieved on leaving their seats 1, particularly in aircraft.

If the seat 1 is now used by another person and this person loads the cover 10 in the seat region 13, which adapts in an elastically restorable manner to the external body shape of the user, a compressive force is exerted on the activation element 237 which thereby displaces it relative to the base frame 6 or cover carrying frame 19 or to the cladding element 7. This actuation of the activation element 237 releases the locking device 203 of the force storage device 202 so that the force storage device 202 is displaced and activates the transmission device 200. As a result of the restoring of the pivotable frame part 59 into the rest position shown by the solid lines in FIG. 18, for example, the gas spring is suitably pre-tensioned and as a result of actuation or unlocking of the locking device 203, the pivotable frame part 59 is now automatically pivoted upwards via this adjusting force and by translation via the transmission device 200 and consequently via the parallelogram lever arrangement 201 from the rest position shown by the solid lines in FIG. 18 into the user position shown by the dashed lines in FIG. 18.

Thus, the entire seat surface is available for the user of the seat 1 during sitting and at the same time, the advantage is achieved that by the manipulation before sitting down or leaving the seat, a larger freedom of movement is achieved for stowing items of luggage under the seats located in front or the like.

It is also advantageous that in addition to the automatic adjustment from the rest position shown by the solid lines in FIG. 18 into the user position shown by the dashed lines, a return of the adjustable frame part 59 is also possible. For this purpose it is possible to bring about an automatic retraction of the pivotable frame part 59 into the rest position by means of devices suitably acted upon by force by using fluid pressurised with mechanical means or by means of electrically actuated adjusting devices when an unloading of the cover 10 is detected by the activation element 237. At the same time, the force storage device 202 can be pre-tensioned so that during the next use, the pivotable frame part 59 can be returned in to the usage position without supplying external energy.

The exemplary embodiments show possible embodiments of the seat 1, wherein it should be noted at this point that the invention is not restricted to the specially depicted embodiments of the same but rather various combinations of the individual embodiments amongst one another are possible and this possibility for variation lies within the ability of the person skilled in the art who is active in this technical field as a result of the teaching on the technical action by the present invention. Thus, all feasible embodiments which are possible by combining individual details of the embodiments depicted and described are covered by the scope of protection.

For the sake of good order, it should finally be noted that for a better understanding of the structure of the seat 1, the seat or its components are shown partially not to scale and/or enlarged and/or reduced in size.

The object forming the basis of the independent inventive solutions can be deduced from the description.

In particular, the individual explanations shown in FIGS. 1, 2, 3, 4; 5; 6, 7; 8, 9, 10; 11; 12; 13, 14; 15, 16; 17, 18, 19 form the subject matter of independent solutions according to the invention. The relevant objects and solutions according to the invention can be deduced from the detailed descriptions of these figures.

| REFERENCE LIST | |
|---|---|
| 1 | Seat |
| 2 | Carrying frame |
| 3 | Standing surface |
| 4 | User side |
| 5 | Rear side |
| 6 | Base frame |
| 7 | Cladding element |
| 8 | Support unit |
| 9 | Support surface |
| 10 | Cover |
| 11 | Knitted fabric |
| 12 | Back region |
| 13 | Seat region |
| 14 | Angle |
| 15 | Vertical |
| 16 | Angle |
| 17 | Buttocks region |
| 18 | Thigh region |
| 19 | Cover carrying frame |
| 20 | Armrest |
| 21 | Head support |
| 22 | Display element |
| 23 | Table |
| 24 | Receiving element |
| 25 | Retaining element |
| 26 | Surface |
| 27 | Depression |
| 28 | Backrest |
| 29 | Shoulder region |
| 30 | Head region |
| 31 | Angle |
| 32 | Body contour |
| 33 | Zone 1 |
| 34 | Zone 2 |
| 35 | Zone 3 |
| 36 | Zone 4 |
| 37 | Zone 5 |
| 38 | Zone 6 |
| 39 | |
| 40 | |
| 41 | Longitudinal edge region |
| 42 | Edge section |
| 43 | Edge section |
| 44 | Thread |
| 45 | Thread |
| 46 | Thread |
| 47 | Thread |
| 48 | Angle of incidence |
| 49 | Receiving side |
| 50 | Support element |
| 51 | Inner surface |
| 52 | Intermediate layer |
| 53 | Support belt |

-continued

| REFERENCE LIST | |
|---|---|
| 54 | Illuminant |
| 55 | Depression |
| 56 | Width |
| 57 | Support section |
| 58 | Linkage arrangement |
| 59 | Frame part |
| 60 | Width |
| 61 | Detection device |
| 62 | Adjusting device |
| 63 | Actuating device |
| 64 | Recess |
| 65 | Adjusting device |
| 66 | Central part |
| 67 | Lateral part |
| 68 | Lateral part |
| 69 | Upholstery |
| 70 | Pivot axis |
| 71 | Pivot axis |
| 72 | Linkage arrangement |
| 73 | Linkage arrangement |
| 74 | Carrying element |
| 75 | Carrying element |
| 76 | Carrying element |
| 77 | Carrying arrangement |
| 78 | Coupling element |
| 79 | Linkage arrangement |
| 80 | Pivot axis |
| 81 | Guide arrangement |
| 82 | Table surface |
| 83 | Receiving compartment |
| 84 | Front side |
| 85 | Compartment wall |
| 86 | Angle |
| 87 | Illumination means |
| 200 | Transmission device |
| 201 | Parallelogram lever arrangement |
| 202 | Force storage device |
| 203 | Locking device |
| 204 | Depression |
| 205 | Fastening means |
| 206 | Central support |
| 207 | Multilever arrangement |
| 208 | Cylinder |
| 209 | Control arm |
| 210 | Toggle lever |
| 211 | Articulation axis |
| 212 | Deflection lever |
| 213 | Control lever |
| 214 | Control lever |
| 215 | Swivel arm |
| 216 | Swivel arm |
| 217 | Fixed bearing |
| 218 | End region |
| 219 | Sliding shoe |
| 220 | Guide track |
| 221 | Elongate hole |
| 222 | Bearing block |
| 223 | Connecting lever |
| 224 | Angle lever |
| 225 | Kink region |
| 226 | Leg |
| 227 | Leg |
| 228 | Swivel axis |
| 229 | Axis of rotation |
| 230 | Parallelogram lever |
| 231 | Articulation axis |
| 232 | Parallelogram lever |
| 233 | Axis of rotation |
| 234 | Transition element |
| 235 | Transition part |
| 236 | Transition part |
| 237 | Activation element |
| 238 | Angle lever |
| 239 | Bowden cable |
| 240 | Transmission element |

The invention claimed is:

1. A seat having a carrying frame and a support unit connected thereto, said support unit having a base frame as well as an elastic cover held thereon, said elastic cover being made of a single-piece knitted fabric and is fastened and pre-tensioned on said base frame as a self-supporting structure and said knitted fabric having a knitted fabric width between left and right longitudinal edge regions of said knitted fabric defining a length of said elastic cover in a longitudinal direction, and said cover forming a support surface having a seat region and a back region, wherein said cover is configured to be continuous in said longitudinal direction between said seat region and said back region and said knitted fabric forming said cover has a plurality of zones with different properties with respect to one another located consecutively in said length of said cover, of which at least one zone has a greater elastic deformability relative to the other zones, wherein said zone having the greatest elastic deformability is formed between said seat region and said back region, and wherein on both sides between said zone forming said seat region and said left and right longitudinal edge regions a strip-shaped edge section is arranged and the knitted fabric forming said strip-shaped edge sections has the same properties as said zone having the greatest elastic deformability.

2. The seat according to claim 1, wherein the zone having the greatest elastic deformability has an elasticity according to DIN EN 14704-1 in a range having a lower limit of 10 N and an upper limit of 40 N, preferably 22 N, with a linear strain of 100%.

3. The seat according to claim 1, wherein the zone forming the back region has a strength in the strip tensile test according to DIN EN 13934-1 in a range having a lower limit of 700 N and an upper limit of 1400 N, preferably of 1080 N.

4. The seat according to claim 1, wherein a strip-shaped edge section of the zone of the back region is disposed in each case in the longitudinal edge region of the knitted fabric on both sides of the zone having the greatest elastic deformability.

5. The seat according to claim 4, wherein in each case a transition between the strip-shaped edge section and a zone end of the zone having the greatest elastic deformability, running transversely thereto, is configured to run in an arcuate shape.

6. The seat according to claim 1, wherein the zone forming the seat region has a strength in the strip tensile test according to DIN EN 13934-1 in a range having a lower limit of 800 N and an upper limit of 1500 N.

7. The seat according to claim 1, wherein in each case a transition between the strip-shaped edge section and a zone end of the zone forming the seat region, running transversely thereto, is configured to run in an arcuate shape.

8. The seat according to claim 1, wherein the support unit comprises at least one base frame and a cladding element which receives said frame.

9. The seat according to claim 8, wherein the cladding element defines a fixed angle between the back region and the seat region.

10. The seat according to claim 8, wherein the base frame is detachably connected to the cladding element.

11. The seat according to claim 8, wherein the cladding element and the base frame are connected to one another and the cover is spanned on its own cover carrying frame and said carrying frame is detachably connected to the support unit comprising the cladding element and the base frame.

12. The seat according to claim 8, wherein at least one intermediate layer is disposed on an inner surface of the cladding element facing the user, and the intermediate layer is formed from a plastic foam which is configured to be flame-retardant.

13. The seat according to claim 8, wherein at least one support belt aligned transversely to the longitudinal extension of the cover is provided between the cover and the inner surface of the cladding element.

14. The seat according to claim 1, wherein in an unused state the seat region is configured to run ascendingly towards the back region with regard to a standing plane for the seat.

15. The seat according to claim 1, wherein in a used state the seat region is configured to run descendingly towards the back region with regard to a standing plane for the seat.

16. The seat according to claim 1, wherein the cover is spanned on the base frame.

17. The seat according to claim 1, wherein a support section of the cover which can face a back-of-the-knee region of the user is configured to be pivotable with respect to the support unit.

18. The seat according to claim 17, wherein the support section is formed by a frame part of the base frame and/or cover carrying frame which is pivotable with respect to the support unit.

19. The seat according to claim 18, wherein an actuating device is associated with the frame part by which means said part is adjustable between its readiness position and usage position and wherein the actuating device comprises a detection device associated with the seat region and an adjusting device in line connection therewith and the adjusting device is operatively connected to the frame part.

20. The seat according to claim 1, wherein a headrest located in front of the cover is held on the support unit in a head region of the cover and the headrest comprises a central part and side parts which are disposed on both sides thereof and are adjustable by means of pivot axes.

* * * * *

UNITED STATES PATENT AND TRADEMARK OFFICE
CERTIFICATE OF CORRECTION

PATENT NO. : 8,419,135 B2  Page 1 of 1
APPLICATION NO. : 12/450781
DATED : April 16, 2013
INVENTOR(S) : Moeseneder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 662 days.

Signed and Sealed this
First Day of September, 2015

Michelle K. Lee
*Director of the United States Patent and Trademark Office*